US012705875B2

(12) United States Patent
Chemerys et al.

(10) Patent No.: US 12,705,875 B2
(45) Date of Patent: Aug. 11, 2026

(54) LOSS DETERMINATION FOR LATENT DIFFUSION MODELS

(71) Applicant: Snap Inc., Santa Monica, CA (US)

(72) Inventors: Pavlo Chemerys, New York, NY (US); Colin Eles, Marina del Rey, CA (US); Ju Hu, Los Angeles, CA (US); Qing Jin, Palo Alto, CA (US); Yanyu Li, Quincy, MA (US); Ergeta Muca, Long Island City, NY (US); Jian Ren, Marina Del Ray, CA (US); Dhritiman Sagar, New York, NY (US); Aleksei Stoliar, Marina del Rey, CA (US); Sergey Tulyakov, Santa Monica, CA (US); Huan Wang, Somerville, MA (US)

(73) Assignee: Snap Inc., Santa Monica, CA (US)

( * ) Notice: Subject to any disclaimer, the term of this patent is extended or adjusted under 35 U.S.C. 154(b) by 120 days.

(21) Appl. No.: 18/596,452

(22) Filed: Mar. 5, 2024

(65) Prior Publication Data

US 2024/0394933 A1 Nov. 28, 2024

Related U.S. Application Data

(60) Provisional application No. 63/504,563, filed on May 26, 2023.

(51) Int. Cl.
*G06V 10/82* (2022.01)
*G06N 3/0455* (2023.01)
(Continued)

(52) U.S. Cl.
CPC ........... *G06V 10/82* (2022.01); *G06N 3/0455* (2023.01); *G06N 20/00* (2019.01); *G06T 5/60* (2024.01);
(Continued)

(58) Field of Classification Search
CPC ...... G06V 10/82; G06N 3/0455; G06N 20/00; G06N 3/044; G06N 3/045; G06N 3/047;
(Continued)

(56) References Cited

U.S. PATENT DOCUMENTS

| | | | |
|---|---|---|---|
| 5,604,843 | A | 2/1997 | Shaw et al. |
| 5,689,559 | A | 11/1997 | Park |

(Continued)

FOREIGN PATENT DOCUMENTS

| | | |
|---|---|---|
| CN | 109863532 | 6/2019 |
| CN | 110168478 | 8/2019 |

(Continued)

OTHER PUBLICATIONS

Meng et al. On Distillation of Guided Diffusion Models [Online]. Apr. 12, 2023 [Retrieved on Oct. 7, 2025]. Retrieved from the Internet: <URL: https://arxiv.org/pdf/2210.03142> (Year: 2023).*

(Continued)

*Primary Examiner* — King Y Poon
*Assistant Examiner* — Michelle Hau Ma
(74) *Attorney, Agent, or Firm* — Schwegman Lundberg & Woessner, P.A.

(57) ABSTRACT

Described is a system for improving machine learning models by accessing a first latent diffusion machine learning model, accessing a second latent diffusion machine learning model that was derived from the first latent diffusion machine learning model, the second latent diffusion machine learning model trained to perform a second number of denoising steps, generating noise data, processing the noise data via the first latent diffusion machine learning model to generate one or more first latent features, processing the noise data via the second latent diffusion machine learning model to generate one or more second latent features, and inputting the one or more first latent features and the one or
(Continued)

more second latent features into a loss function. The system then modifies a parameter of the second latent diffusion machine learning model based on the output of the loss function.

19 Claims, 16 Drawing Sheets

(51) Int. Cl.

| | |
|---|---|
| ***G06N 20/00*** | (2019.01) |
| ***G06T 5/60*** | (2024.01) |
| ***G06T 5/70*** | (2024.01) |
| ***G06T 11/00*** | (2026.01) |
| ***G10L 15/18*** | (2013.01) |
| ***G10L 15/22*** | (2006.01) |

(52) U.S. Cl.
CPC ................ *G06T 5/70* (2024.01); *G06T 11/00* (2013.01); *G10L 15/1815* (2013.01); *G10L 15/22* (2013.01); *G06T 2200/24* (2013.01); *G06T 2207/20081* (2013.01); *G06T 2207/20084* (2013.01)

(58) Field of Classification Search
CPC .......... G06N 3/084; G06N 3/088; G06T 5/60; G06T 5/70; G06T 11/00; G06T 2200/24; G06T 2207/20081; G06T 2207/20084; G10L 15/1815; G10L 15/22; G10L 15/16
See application file for complete search history.

(56) References Cited

U.S. PATENT DOCUMENTS 5,880,731 A 3/1999 Liles et al.
6,023,270 A 2/2000 Brush, II et al.
RE36,919 E 10/2000 Park
RE37,052 E 2/2001 Park
6,223,165 B1 4/2001 Lauffer
6,650,793 B1 11/2003 Lund et al.
6,772,195 B1 8/2004 Hatlelid et al.
6,804,417 B1 10/2004 Lund et al.
6,842,779 B1 1/2005 Nishizawa
7,342,587 B2 3/2008 Danzig et al.
7,468,729 B1 12/2008 Levinson
7,636,755 B2 12/2009 Blattner et al.
7,639,251 B2 12/2009 Gu et al.
7,775,885 B2 8/2010 Van et al.
7,859,551 B2 12/2010 Bulman et al.
7,885,931 B2 2/2011 Seo et al.
7,925,703 B2 4/2011 Dinan et al.
8,088,044 B2 1/2012 Tchao et al.
8,095,878 B2 1/2012 Bates et al.
8,108,774 B2 1/2012 Finn et al.
8,117,281 B2 2/2012 Robinson et al.
8,130,219 B2 3/2012 Fleury et al.
8,146,005 B2 3/2012 Jones et al.
8,151,191 B2 4/2012 Nicol
RE43,993 E 2/2013 Park
8,384,719 B2 2/2013 Reville et al.
RE44,054 E 3/2013 Kim
RE44,068 E 3/2013 Park
RE44,106 E 3/2013 Park
8,396,708 B2 3/2013 Park et al.
RE44,121 E 4/2013 Park
8,425,322 B2 4/2013 Gillo et al.
8,458,601 B2 6/2013 Castelli et al.
8,462,198 B2 6/2013 Lin et al.
8,484,158 B2 7/2013 Deluca et al.
8,495,503 B2 7/2013 Brown et al.
8,495,505 B2 7/2013 Smith et al.
8,504,926 B2 8/2013 Wolf
8,559,980 B2 10/2013 Pujol
8,564,621 B2 10/2013 Branson et al.
8,564,710 B2 10/2013 Nonaka et al.
8,581,911 B2 11/2013 Becker et al.
8,597,121 B2 12/2013 del Valle
8,601,051 B2 12/2013 Wang
8,601,379 B2 12/2013 Marks et al.
8,632,408 B2 1/2014 Gillo et al.
8,648,865 B2 2/2014 Dawson et al.
8,659,548 B2 2/2014 Hildreth
8,683,354 B2 3/2014 Khandelwal et al.
8,692,830 B2 4/2014 Nelson et al.
8,810,513 B2 8/2014 Ptucha et al.
8,812,171 B2 8/2014 Filev et al.
8,832,201 B2 9/2014 Wall
8,832,552 B2 9/2014 Arrasvuori et al.
8,839,327 B2 9/2014 Amento et al.
8,890,926 B2 11/2014 Tandon et al.
8,892,999 B2 11/2014 Nims et al.
8,924,250 B2 12/2014 Bates et al.
8,938,696 B1 1/2015 Torunoglu et al.
8,963,926 B2 2/2015 Brown et al.
8,989,786 B2 3/2015 Feghali
9,086,776 B2 7/2015 Ye et al.
9,105,014 B2 8/2015 Collet et al.
9,241,184 B2 1/2016 Weerasinghe
9,256,860 B2 2/2016 Herger et al.
9,298,257 B2 3/2016 Hwang et al.
9,314,692 B2 4/2016 Konoplev et al.
9,330,483 B2 5/2016 Du et al.
9,357,174 B2 5/2016 Li et al.
9,361,510 B2 6/2016 Yao et al.
9,378,576 B2 6/2016 Bouaziz et al.
9,402,057 B2 7/2016 Kaytaz et al.
9,412,192 B2 8/2016 Mandel et al.
9,460,541 B2 10/2016 Li et al.
9,489,760 B2 11/2016 Li et al.
9,503,845 B2 11/2016 Vincent
9,508,197 B2 11/2016 Quinn et al.
9,532,364 B2 12/2016 Fujito
9,544,257 B2 1/2017 Ogundokun et al.
9,576,400 B2 2/2017 Van Os et al.
9,589,357 B2 3/2017 Li et al.
9,592,449 B2 3/2017 Barbalet et al.
9,648,376 B2 5/2017 Chang et al.
9,697,635 B2 7/2017 Quinn et al.
9,706,040 B2 7/2017 Kadirvel et al.
9,744,466 B2 8/2017 Fujioka
9,746,990 B2 8/2017 Anderson et al.
9,749,270 B2 8/2017 Collet et al.
9,792,714 B2 10/2017 Li et al.
9,839,844 B2 12/2017 Dunstan et al.
9,875,440 B1 1/2018 Commons
9,883,838 B2 2/2018 Kaleal, III et al.
9,898,849 B2 2/2018 Du et al.
9,911,073 B1 3/2018 Spiegel et al.
9,936,165 B2 4/2018 Li et al.
9,959,037 B2 5/2018 Chaudhri et al.
9,980,100 B1 5/2018 Charlton et al.
9,990,373 B2 6/2018 Fortkort
10,039,988 B2 8/2018 Lobb et al.
10,097,492 B2 10/2018 Tsuda et al.
10,116,598 B2 10/2018 Tucker et al.
10,155,168 B2 12/2018 Blackstock et al.
10,158,589 B2 12/2018 Collet et al.
10,242,477 B1 3/2019 Charlton et al.
10,242,503 B2 3/2019 McPhee et al.
10,262,250 B1 4/2019 Spiegel et al.
10,348,662 B2 7/2019 Baldwin et al.
10,362,219 B2 7/2019 Wilson et al.
10,388,178 B2 8/2019 Graesser et al.
10,410,113 B2 9/2019 Clayton et al.
10,432,559 B2 10/2019 Baldwin et al.
10,454,857 B1 10/2019 Blackstock et al.
10,475,225 B2 11/2019 Park et al.
10,504,266 B2 12/2019 Blattner et al.
10,573,048 B2 2/2020 Ni et al.
10,656,797 B1 5/2020 Alvi et al.
10,657,695 B2 5/2020 Chand et al.
10,657,701 B2 5/2020 Osman et al.
10,762,174 B2 9/2020 Denton et al.

(56) References Cited

U.S. PATENT DOCUMENTS

| | | | |
|---|---|---|---|
| 10,762,398 | B2 | 9/2020 | Sjölund et al. |
| 10,805,248 | B2 | 10/2020 | Luo et al. |
| 10,872,451 | B2 | 12/2020 | Sheth et al. |
| 10,880,246 | B2 | 12/2020 | Baldwin et al. |
| 10,895,964 | B1 | 1/2021 | Grantham et al. |
| 10,896,534 | B1 | 1/2021 | Smith et al. |
| 10,933,311 | B2 | 3/2021 | Brody et al. |
| 10,938,758 | B2 | 3/2021 | Allen et al. |
| 10,964,082 | B2 | 3/2021 | Amitay et al. |
| 10,979,752 | B1 | 4/2021 | Brody et al. |
| 10,984,575 | B2 | 4/2021 | Assouline et al. |
| 10,992,619 | B2 | 4/2021 | Antmen et al. |
| 11,010,022 | B2 | 5/2021 | Alvi et al. |
| 11,030,789 | B2 | 6/2021 | Chand et al. |
| 11,036,781 | B1 | 6/2021 | Baril et al. |
| 11,063,891 | B2 | 7/2021 | Voss |
| 11,069,103 | B1 | 7/2021 | Blackstock et al. |
| 11,080,917 | B2 | 8/2021 | Monroy-hernández et al. |
| 11,128,586 | B2 | 9/2021 | Al Majid et al. |
| 11,188,190 | B2 | 11/2021 | Blackstock et al. |
| 11,189,070 | B2 | 11/2021 | Jahangiri et al. |
| 11,199,957 | B1 | 12/2021 | Alvi et al. |
| 11,218,433 | B2 | 1/2022 | Baldwin et al. |
| 11,229,849 | B2 | 1/2022 | Blackstock et al. |
| 11,245,658 | B2 | 2/2022 | Grantham et al. |
| 11,249,614 | B2 | 2/2022 | Brody |
| 11,263,254 | B2 | 3/2022 | Baril et al. |
| 11,270,491 | B2 | 3/2022 | Monroy-Hernández et al. |
| 11,284,144 | B2 | 3/2022 | Kotsopoulos et al. |
| 11,669,689 | B2 | 6/2023 | Defelice |
| 12,469,273 | B2 | 11/2025 | Chemerys et al. |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |
| 2005/0206610 | A1 | 9/2005 | Cordelli |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2008/0158222 | A1 | 7/2008 | Li et al. |
| 2009/0016617 | A1 | 1/2009 | Bregman-Amitai et al. |
| 2009/0055484 | A1 | 2/2009 | Vuong et al. |
| 2009/0070688 | A1 | 3/2009 | Gyorfi et al. |
| 2009/0099925 | A1 | 4/2009 | Mehta et al. |
| 2009/0106672 | A1 | 4/2009 | Burstrom |
| 2009/0158170 | A1 | 6/2009 | Narayanan et al. |
| 2009/0177976 | A1 | 7/2009 | Bokor et al. |
| 2009/0202114 | A1 | 8/2009 | Morin et al. |
| 2009/0265604 | A1 | 10/2009 | Howard et al. |
| 2009/0300525 | A1 | 12/2009 | Jolliff et al. |
| 2009/0303984 | A1 | 12/2009 | Clark et al. |
| 2010/0011422 | A1 | 1/2010 | Mason et al. |
| 2010/0023885 | A1 | 1/2010 | Reville et al. |
| 2010/0115426 | A1 | 5/2010 | Liu et al. |
| 2010/0162149 | A1 | 6/2010 | Sheleheda et al. |
| 2010/0203968 | A1 | 8/2010 | Gill et al. |
| 2010/0227682 | A1 | 9/2010 | Reville et al. |
| 2011/0093780 | A1 | 4/2011 | Dunn |
| 2011/0115798 | A1 | 5/2011 | Nayar et al. |
| 2011/0148864 | A1 | 6/2011 | Lee et al. |
| 2011/0239136 | A1 | 9/2011 | Goldman et al. |
| 2012/0113106 | A1 | 5/2012 | Choi et al. |
| 2012/0124458 | A1 | 5/2012 | Cruzada |
| 2012/0130717 | A1 | 5/2012 | Xu et al. |
| 2013/0103760 | A1 | 4/2013 | Golding et al. |
| 2013/0201187 | A1 | 8/2013 | Tong et al. |
| 2013/0249948 | A1 | 9/2013 | Reitan |
| 2013/0257877 | A1 | 10/2013 | Davis |
| 2014/0043329 | A1 | 2/2014 | Wang et al. |
| 2014/0055554 | A1 | 2/2014 | Du et al. |
| 2014/0125678 | A1 | 5/2014 | Wang et al. |
| 2014/0129343 | A1 | 5/2014 | Finster et al. |
| 2015/0206349 | A1 | 7/2015 | Rosenthal et al. |
| 2016/0134840 | A1 | 5/2016 | Mcculloch |
| 2016/0234149 | A1 | 8/2016 | Tsuda et al. |
| 2017/0080346 | A1 | 3/2017 | Abbas |
| 2017/0087473 | A1 | 3/2017 | Siegel et al. |
| 2017/0113140 | A1 | 4/2017 | Blackstock et al. |
| 2017/0118145 | A1 | 4/2017 | Aittoniemi et al. |
| 2017/0199855 | A1 | 7/2017 | Fishbeck |
| 2017/0235848 | A1 | 8/2017 | Van et al. |
| 2017/0310934 | A1 | 10/2017 | Du et al. |
| 2017/0312634 | A1 | 11/2017 | Ledoux et al. |
| 2018/0047200 | A1 | 2/2018 | O'hara et al. |
| 2018/0113587 | A1 | 4/2018 | Allen et al. |
| 2018/0115503 | A1 | 4/2018 | Baldwin et al. |
| 2018/0198743 | A1 | 7/2018 | Blackstock et al. |
| 2018/0315076 | A1 | 11/2018 | Andreou |
| 2018/0315133 | A1 | 11/2018 | Brody et al. |
| 2018/0315134 | A1 | 11/2018 | Amitay et al. |
| 2019/0001223 | A1 | 1/2019 | Blackstock et al. |
| 2019/0057616 | A1 | 2/2019 | Cohen et al. |
| 2019/0097958 | A1 | 3/2019 | Collet et al. |
| 2019/0188920 | A1 | 6/2019 | Mcphee et al. |
| 2019/0280997 | A1 | 9/2019 | Baldwin et al. |
| 2020/0110809 | A1 | 4/2020 | Defelice |
| 2020/0306637 | A1 | 10/2020 | Baldwin et al. |
| 2020/0372127 | A1 | 11/2020 | Denton et al. |
| 2020/0410575 | A1 | 12/2020 | Grantham et al. |
| 2021/0074047 | A1 | 3/2021 | Sheth et al. |
| 2021/0089179 | A1 | 3/2021 | Grantham et al. |
| 2021/0104087 | A1 | 4/2021 | Smith et al. |
| 2021/0168108 | A1 | 6/2021 | Antmen et al. |
| 2021/0170270 | A1 | 6/2021 | Brody et al. |
| 2021/0192823 | A1 | 6/2021 | Amitay et al. |
| 2021/0209825 | A1 | 7/2021 | Assouline et al. |
| 2021/0225058 | A1 | 7/2021 | Chand et al. |
| 2021/0240315 | A1 | 8/2021 | Alvi et al. |
| 2021/0243482 | A1 | 8/2021 | Baril et al. |
| 2021/0243503 | A1 | 8/2021 | Kotsopoulos et al. |
| 2021/0266277 | A1 | 8/2021 | Allen et al. |
| 2021/0281897 | A1 | 9/2021 | Brody et al. |
| 2021/0285774 | A1 | 9/2021 | Collins et al. |
| 2021/0306290 | A1 | 9/2021 | Voss |
| 2021/0306451 | A1 | 9/2021 | Heikkinen et al. |
| 2021/0385180 | A1 | 12/2021 | Al Majid et al. |
| 2021/0405831 | A1 | 12/2021 | Mourkogiannis et al. |
| 2021/0409535 | A1 | 12/2021 | Mourkogiannis et al. |
| 2022/0012929 | A1 | 1/2022 | Blackstock et al. |
| 2022/0139245 | A1 | 5/2022 | Wilson et al. |
| 2022/0262104 | A1 | 8/2022 | Salman et al. |
| 2022/0293192 | A1 | 9/2022 | Berman et al. |
| 2023/0011337 | A1 | 1/2023 | Qian et al. |
| 2023/0377099 | A1* | 11/2023 | Kreis .................. G06N 3/0475 |
| 2024/0169500 | A1 | 5/2024 | Zheng et al. |
| 2024/0185498 | A1 | 6/2024 | Francis |
| 2024/0185588 | A1 | 6/2024 | Kumari et al. |
| 2024/0394843 | A1 | 11/2024 | Chemerys et al. |
| 2024/0394932 | A1 | 11/2024 | Chemerys et al. |
| 2024/0395028 | A1 | 11/2024 | Chemerys et al. |

FOREIGN PATENT DOCUMENTS

| | | | | |
|---|---|---|---|---|
| CN | 112508169 A | * | 3/2021 | ............. G06N 3/045 |
| CN | 115687914 A | * | 2/2023 | |
| CN | 121263802 A | | 1/2026 | |
| EP | 2184092 | | 5/2010 | |
| JP | 2001230801 | | 8/2001 | |
| JP | 5497931 | | 3/2014 | |
| KR | 101445263 | | 9/2014 | |
| WO | 2003094072 | | 11/2003 | |
| WO | 2004095308 | | 11/2004 | |
| WO | 2006107182 | | 10/2006 | |
| WO | 2007134402 | | 11/2007 | |
| WO | 2012139276 | | 10/2012 | |
| WO | 2013027893 | | 2/2013 | |
| WO | 2013152454 | | 10/2013 | |
| WO | 2013166588 | | 11/2013 | |
| WO | 2014031899 | | 2/2014 | |
| WO | 2014194439 | | 12/2014 | |
| WO | 2016090605 | | 6/2016 | |
| WO | 2018081013 | | 5/2018 | |
| WO | 2018102562 | | 6/2018 | |
| WO | 2018129531 | | 7/2018 | |

(56) References Cited

FOREIGN PATENT DOCUMENTS

| | | | |
|---|---|---|---|
| WO | 2019089613 | | 5/2019 |
| WO | WO-2024049441 | A1 | 3/2024 |
| WO | 2024249060 | | 12/2024 |
| WO | 2024249074 | | 12/2024 |
| WO | 2024249181 | | 12/2024 |
| WO | 2024249218 | | 12/2024 |

OTHER PUBLICATIONS

Kim et al. On Architectural Compression of Text-to-Image Diffusion Models [Online]. May 25, 2023 [Retrieved on Oct. 8, 2025]. Retrieved from the Internet: <URL: https://arxiv.org/pdf/2305.15798v1 > (Year: 2023).*

Liao et al. Text-driven Visual Synthesis with Latent Diffusion Prior [Online]. Apr. 3, 2023 [Retrieved on Oct. 8, 2025]. Retrieved from the Internet: <URL: https://arxiv.org/pdf/2302.08510 > (Year: 2023).*

Salimans et al. Progressive Distillation for Fast Sampling of Diffusion Models [Online]. Jun. 7, 2022 [ Retrieved on Oct. 8, 2025]. Retrieved from the Internet: <URL: https://arxiv.org/pdf/2202.00512 > (Year: 2022).*

Luhman et al. Knowledge Distillation in Iterative Generative Models for Improved Sampling Speed [Online]. Jan. 7, 2021 [ Retrieved on Oct. 8, 2025]. Retrieved from the Internet: <URL: https://arxiv.org/pdf/2101.02388 > (Year: 2021).*

Song et al. Consistency Models [Online]. Mar. 2, 2023 [Retrieved on Feb. 10, 2026]. Retrieved from the Internet: <URL: https://arxiv.org/pdf/2303.01469v1 > (Year: 2023).*

Gl et al. Efficient knowledge distillation of teacher model to multiple student models [Online]. Sep. 17, 2021 [Retrieved on Feb. 10, 2026]. Retrieved from the Internet: <URL: https://ieeexplore.ieee.org/document/9532543?source=IQplus > (Year: 2021).*

"Bitmoji Customize text", [Online] Retrieved from the Internet: URL: https: web.archive.org web 20210225200456 https: support.bitmoji.com hc en-us articles 360034632291-Customize-Text-on-Bitmoji-Stickers, (captured Feb. 25, 2021), 3 pgs.

"Bitmoji Chrome Extension", [Online] Retrieved from the Internet: URL: https: web.archive.org web 20200919024925 https: support.bimoji.com hc en-us articles 360001494066, (Sep. 19, 2020), 5 pgs.

"Bitmoji", Snapchat Support, [Online] Retrieved from the Internet: URL: https: web.archive. org web 20190503063620 https: support.snapchat.com en-us a bitmoji, (captured May 3, 2019), 2 pgs.

"Manage Your Bitmoji", Snapchat Support, [Online] Retrieved from the Internet: URL: https: web.archive.org web 20190503063620 https: support.snapchat.com en-us a manage-bitmoji, (captured May 3, 2019), 3 pgs.

"Bitmoji Family", Snapchat Support, [Online] Retrieved from the Internet: URL: https: web.archive.org web 20190503063620 https: support.snapchat.com en-us article bitmoji-family, (captured May 3, 2019), 4 pgs.

"Your Own Personal Emoji", Bitstrips Inc, [Online] Retrieved from the Internet: URL: https: web.archive.org web 20150205232004 http: bitmoji.com , (captured Feb. 5, 2015), 3 pgs.

"Instant Comics Starring You and Your Friends", Bitstrips Inc, [Online] Retrieved from the Internet: URL: https: web. archive.org web 20150206000940 http: company.bitstrips.com bitstrips-app.html, (captured Feb. 6, 2015), 3 pgs.

Carnahan, Daniel, "Snap is Offering Personalized Video Content Through Bitmoji TV", Business Insider, [Online] Retrieved from the Internet: URL: https: www.businessinsider.com snap-offers-personalized-video-content-through-bitmoji-tv-2019-12, (2019), 10 pgs.

Constine, Josh, "Snapchat launches Bitmoji merch and comic strips starring your avatar", TechCrunch, [Online] Retrieved from the Internet: URL: https: techcrunch.com Nov. 13, 2018 bitmoji-store , (Nov. 13, 2018), 16 pgs.

Constine, Josh, "Snapchat Launches Bitmoji TV: Zany 4-min Cartoons of Your Avatar", TechCrunch, [Online] Retrieved from the Internet: URL: https: techcrunch.com Jan. 30, 2020 bitmoji-tv , (Jan. 3, 20200), 13 pgs.

Macmillan, Douglas, "Snapchat Buys Bitmoji App for More Than $100 Million", The Wallstreet Journal, [Online] Retrieved from the Internet: URL: https: www.wsj.com articles snapchat-buys-bitmoji-app-for-more-than-100-million-1458876017, (Mar. 25, 2016), 5 pgs.

Newton, Casey, "Your Snapchat friendships now have their own profiles—and merchandise", The Verge, [Online] Retrieved from the Internet: URL: https: www.theverge.com 2018 11 13 18088772 snapchat-friendship-profiles-bitmoji-merchandise-comics, (Nov. 13, 2018), 5 pgs.

Ong, Thuy, "Snapchat takes Bitmoji deluxe with hundreds of new customization options", The Verge, [Online] Retrieved from the Internet on 11 02 2018: URL: https: www.theverge.com Jan. 30, 2018 16949402 bitmoji-deluxe-snapchat-customization, (Jan. 30, 2018), 2 pgs.

Reign, Ashley, "How To Add My Friend's Bitmoji To My Snapchat", Women.com, [Online] Retrieved from the Internet: URL: https: www.women.com ashleyreign lists how-to-add-my-friends-bitmoji-to-my-snapchat, (Jun. 30, 2017), 7 pgs.

Tumbokon, Karen, "Snapchat Update: How To Add Bitmoji To Customizable Geofilters", International Business Times, [Online] Retrieved from the Internet : URL: https: www.ibtimes.com snapchat-update-how-add-bitmoji-customizable-geofilters-2448152, (Nov. 18, 2016), 6 pgs.

"U.S. Appl. No. 18/400,873, Non Final Office Action mailed Nov. 14, 2024", 16 pgs.

"U.S. Appl. No. 18/400,873, Examiner Interview Summary mailed Dec. 30, 2024", 2 pgs.

"U.S. Appl. No. 18/400,873, Final Office Action mailed Jan. 21, 2025", 17 pgs.

"U.S. Appl. No. 18/400,873, Examiner Interview Summary mailed Feb. 13, 2025", 2 pgs.

"U.S. Appl. No. 18/400,873, Non Final Office Action mailed Mar. 21, 2025", 17 pgs.

"U.S. Appl. No. 18/400,873, Response filed Jun. 19, 2025 to Non Final Office Action mailed Mar. 21, 2025", 10 pgs.

"U.S. Appl. No. 18/400,873, Examiner Interview Summary mailed Jun. 20, 2025", 2 pgs.

"U.S. Appl. No. 18/400,873, Corrected Notice of Allowability mailed Aug. 4, 2025", 2 pgs.

Byeon, Minwoo, "Coyo-700m Image-text pair dataset.", kakaobrain coyo-dataset, [Online]. Retrieved from the Internet URL https github.com kakaobrain coyo-dataset, Retrieved on Jun. 7, 2025, archived Nov. 3, 2022, 11 pgs.

Chang, Huiwen, "Muse Text-To-Image Generation via Masked Generative Transformers", arXiv preprint arXiv2301.00704, 2023, 12 pgs.

Dhariwal, Prafulla, "Diffusion Models Beat Gans On Image Synthesis", Advances in neural information processing systems 34, 2021, 15 pgs.

Elsken, Thomas, "Neural architecture search A survey", Journal of Machine Learning Research 2055, 2019, 21 pgs.

He, Yihui, "Channel Pruning for Accelerating Very Deep Neural Networks", Proceedings of the IEEE international conference on computer vision, 2017, 1389-1397.

Ho, Jonathan, "Imagen Video High Definition Video Generation with Diffusion Models", arXiv preprint arXiv2210.02303v1, Oct. 5, 2022, 18 pgs.

Ho, Jonathan, "Classifier-Free Diffusion Guidance", arXiv preprint arXiv2207.12598, 2022, 14 pgs.

Hou, Jilei, "World's first on-device demonstration of Stable Diffusion on an Android phone", Qualcomm, [Online]. Retrieved from the Internet URL https www.qualcomm.com news onq Feb. 2023 worlds-first-on-device-demonstration-of-stable-diffusion-on-android, Feb. 23, 2023, 11 pgs.

Jin, Qing, "Teachers Do More Than Teach Compressing Image-to-Image Models", Proceedings of the IEEE CVF Conference on Computer Vision and Pattern Recognition, 13600-13611, 2021, 12 pgs.

Kim, Bo-Kyeong, "On Architectural Compression of Text-to-Image Diffusion Models", Arxiv.Org, Cornell University Library, 201 Olin Library Cornell University Ithaca, NY 14853, May 25, 2023, 13 pgs.

(56) References Cited

OTHER PUBLICATIONS

Kingma, D., "Adam a Method for Stochastic Optimization", International conference on learning representations ICLR vol. 5, 2015, 15 pgs.
Kingma, D. P, "Auto-encoding variational bayes", arXiv preprint arXiv1312.6114, 2013, 14 pgs.
Li, Muyang, "Efficient Spatially Sparse Inference for Conditional GANs and Diffusion Models", arXiv preprint arXiv2211.02048, 2022, 22 pgs.
Li, Xiuyu, "Q-Diffusion Quantizing Diffusion Models", arXiv preprint arXiv2302.04304, Feb. 10, 2023, 12 pgs.
Li, Yanyu, "SnapFusion Text-to-Image Diffusion Model on Mobile Devices within Two Seconds", arXiv2306.00980v1 [cs.CV], Jun. 1, 2023, 17 pgs.
Li, Yanyu, "EfficientFormer Vision Transformers at MobileNet Speed", aXiv preprint arXiv2206.01191, 2022, 19 pgs.
Li, Yanyu, "Rethinking Vision Transformers for MobileNet Size and Speed", arXiv preprint arXiv2212.08059, 2022, 14 pgs.
Li, Yanyu, "SnapFusion Text-to-Image Diffusion Model on Mobile Devices within Two Seconds", 37th Conference on Neural Information Processing Systems NeurIPS 2023, 2023, 17 pgs.
Lin, Chen-Hsuan, "Magic3D High-Resolution Text-to-3D Content Creation", arXiv preprint arXiv2211.10440, 2022, 19 pgs.
Lin, Tsung-Yi, "Microsoft COCO Common Objects in Context", Computer Vision—ECCV 201413th European Conference, Zurich, Switzerland, Sep. 6-12, 2014, Proceedings, Part V 13, pp. 740-755, Springer, 2014, 15 pgs.
Lu, Cheng, "DPM-Solver++ Fast Solver for Guided Sampling of Diffusion Probabilistic Models", arXiv preprint arXiv2211.01095, 2022, 1-24.
Luhman, Eric, "Knowledge Distillation in Iterative Generative Models for Improved Sampling Speed", arXiv preprint arXiv2101.02388, 2021, 1-20.
Nichol, Alex, "Glide Towards photorealistic image generation and editing with text-guided diffusion models", arXiv preprint arXiv2112.10741, [Online] Retrieved from the internethttps arxiv.org abs 2112.10741, 2021, 20 pgs.
Poole, Ben, "DreamFusion Text-to-3D using 2D Diffusion", arXiv preprint arXiv2209.14988, Sep. 29, 2022, 18 pgs.
Radford, Alec, "Learning Transferable Visual Models from Natural Language Supervision", In Proceedings of the 38th International Conference on Machine Learning, ICML, Virtual Event, vol. 139 of Proceedings of Machine Learning Research PMLR, 8748-8763, 2021, 16 pgs.
Ramesh, Aditya, "Zero-Shot Text-to-Image Generation", Proceedings of the 37th International Conference on Machine Learning, Online, PMLR 139, 2020, 11 pgs.
Rombach, Robin, "High-Resolution Image Synthesis with Latent Diffusion Models", Proceedings of the IEEE CVF conference on computer vision and pattern recognition, 2022, 10684-10695.
Saharia, Chitwan, "Palette Image-to-image diffusion models", ACM SIGGRAPH 2022 Conference Proceedings, 2022, 10 pgs.
Salimans, Tim, "Progressive distillation for fast sampling of diffusion models", arXiv preprint arXiv2202.00512, 2022, 21 pgs.
Shang, Yuzhang, "Post-training Quantization on Diffusion Models", arXiv preprint arXiv2211.15736, Nov. 28, 2022, 10 pgs.
Singer, Uriel, "Make-a-Video Text-to-Video Generation without Text-Video Data", In ICLR, 2023, 16 pgs.
Sohl-Dickstein, Jascha, "Deep unsupervised learning using nonequilibrium thermodynamics", In ICML, 2015, 18 pgs.
Song, Yang, "Generative modeling by estimating gradients of the data distribution", In NeurIPS, 2019, 13 pgs.
Ulhaq, Anwaar, "Efficient Diffusion Models for Vision A Survey", Arxiv.Org, Cornell University Library, 201 Olin Library Cornell University Ithaca, NY 1485, Oct. 7, 2022, 17 pgs.
Wang, Huan, "Neural Pruning Via Growing Regularization", arXiv2012.09243v2, 2021, 16 pgs.
Wang, Huan, "Trainability preserving neural pruning", The Eleventh International Conference on Learning Representations, Feb. 2023, 21 pgs.
Watson, Daniel, "Learning Fast Samplers for Diffusion Models by Differentiating Through Sample Quality", International Conference on Learning Representations, 2022, 17 pgs.
Yu, Jiahui, "Slimmable neural networks", arXiv preprint arXiv1812.08928, 2019, 12 pgs.
Yuan, Geng, "Layer Freezing and Data Sieving Missing Pieces of a Generic Framework for Sparse Training", arXiv preprint arXiv2209.11204, 2022, 21 pgs.
Zeng, Xiaohui, "Lion Latent Point Diffusion Models for 3D Shape Generation", 36th Conference on Neural Information Processing Systems NeurIPS 2022, 2022, 19 pgs.
Zhou, Yufan, "Shifted Diffusion for Text-to-image Generation", Arxiv.Org, Cornell University Library, 201 Olin Library Cornell University Ithaca, NY 14853, Nov. 24, 2022, 19 pgs.
Zoph, Barret, "Neural architecture search with reinforcement learning", arXiv preprintpgs.
"International Application Serial No. PCT US2024 029093, International Search Report mailed Sep. 19, 2024", 4 pgs.
"International Application Serial No. PCT US2024 029093, Written Opinion mailed Sep. 19, 2024", 7 pgs.
"International Application Serial No. PCT US2024 030384, International Search Report mailed Sep. 19, 24", 4 pgs.
"International Application Serial No. PCT US2024 030384, Written Opinion mailed Sep. 19, 24", 8 pgs.
"International Application Serial No. PCT US2024 029294, International Search Report mailed Sep. 19, 24", 4 pgs.
"International Application Serial No. PCT US2024 029294, Written Opinion mailed Sep. 19, 24", 8 pgs.
"International Application Serial No. PCT US2024 030601, International Search Report mailed Sep. 19, 24", 4 pgs.
"International Application Serial No. PCT US2024 030601, Written Opinion mailed Sep. 19, 24", 8 pgs.
"Application Serial No. 18 400,873, Response filed Jan. 7, 25 to Non Final Office Action mailed Nov. 14, 24", 9 pgs.
"Application Serial No. 18 400,873, Response filed Feb. 20, 25 to Final Office Action mailed Jan. 21, 25", 9 pgs.
"NVIDIA TensorRT", NVIDIA Developer, [Online]. Retrieved from the Internet URL https web.archive. org web 20230412192120 https developer.nvidia.com tensorrt, Retrieved on Jun. 19, 2025, archived Apr. 12, 2023, 7 pgs.
"Application Serial No. 18 400,873, Notice of Allowance mailed Jul. 15, 25", 9 pgs.
Balaji, Yogesh, "eDiffi Text-to-image diffusion models with an ensemble of expert denoisers", arXiv preprint arXiv2211.01324, 2022, 24 pgs.
Chen, Yu-Hui, "Speed Is All You Need On-Device Acceleration of Large Diffusion Models via GPU-Aware Optimizations", arXiv preprint arXiv2304.11267, Apr. 21, 2023, 5 pgs.
Dao, Tri, "FlashAttention Fast and Memory-Efficient Exact Attention with IO-Awareness", arXiv preprint arXiv2205.14135, Jun. 24, 2022, 34 pgs.
Dockhorn, Tim, "Genie Higher-Order Denoising Diffusion Solvers", arXiv preprint arXiv2210.05475, 2022, 46 pgs.
Ho, Jonathan, "Denoising Diffusion Probabilistic Models", Advances in neural information processing systems, 33, 2020, 25 pgs.
Huang, Gao, "Deep Networks with Stochastic Depth", B. Leibe et al. Eds. ECCV 2016, Part Iv, Lncs 9908, 2016, 646-661.
Jolicoeur-Martineau, Alexia, "Gotta Go Fast When Generating Data with Score-Based Models", arXiv preprint arXiv2105. 14080, 2021, 24 pgs.
Karras, Tero, "Elucidating the Design Space of Diffusion-Based Generative Models", arXiv preprint arXiv2206.00364, 2022, 44 pgs.
Liu, Luping, "Pseudo Numerical Methods for Diffusion Models on Manifolds", arXiv preprint arXiv2202.09778, 2022, 24 pgs.
Liu, Zhuang, "Learning Efficient Convolutional Networks through Network Slimming", Proceedings of the IEEE international conference on computer vision, 2017, 2755-2763.
Lu, Cheng, "DPM-Solver A Fast ODE Solver for Diffusion Probabilistic Model Sampling in Around 10 Steps", arXiv preprint arXiv2206.00927, 2022, 31 pgs.

(56) References Cited

OTHER PUBLICATIONS

Lugmayr, Andreas, "RePaint Inpainting using Denoising Diffusion Probabilistic Models", Proceedings of the IEEE Cvf conference on computer vision and pattern recognition, 2022, 25 pgs.
Meng, Chenlin, "On Distillation of Guided Diffusion Models", In Proceedings of the IEEE Cvf Conference on Computer Vision and Pattern Recognition, p. 14297-14306, Apr. 12, 2023, 36 pgs.
Orhon, Atila, "Stable Diffusion with Core ML on Apple Silicon", Apple Machine Learning Research, [Online]. Retrieved from the Internet URL https machinelearning.apple.com research stable-diffusion-coreml-apple-silicon, Dec. 2022, 5 pgs.
Peebles, William, "Scalable Diffusion Models with Transformers", Proceedings of the IEEE Cvf international conference on computer vision, 2023, 4195-4205.
Ramesh, Aditya, "Hierarchical Text-Conditional Image Generation with CLIP Latents", arXiv preprint arXiv2204.06125, 2022, 27 pgs.
Rezende, Danilo Jimenez, "Stochastic Backpropagation and Approximate Inference in Deep Generative Models", Proceedings of the 31 st International Conference on Machine Learning, Beijing, China, JMLR WandCP vol. 32, 2014, 9 pgs.
Rombach, Robin, "High-Resolution Image Synthesis with Latent Diffusion Models", Arxiv. Org, Cornell University Library, 201 Olin Library Cornell University Ithaca, NY 14853, Dec. 20, 2021, 45 pgs.
Ronneberger, O., "U-net Convolutional networks for biomedical image segmentation", International Conference on Medical image computing and computer-assisted intervention. Springer, 2015, pp. 234-241., May 2015, 8 pgs.
Saharia, Chitwan, "Photorealistic text-to-image diffusion models with deep language understanding", arXiv preprint arXiv2205. 11487v1, 2022, 46 pgs.
Saharia, Chitwan, "Image Super-Resolution via Iterative Refinement", IEEE Transactions on Pattern Analysis and Machine Intelligence, vol. 45, No. 4, Apr. 2023, 4713-4726.
Schuhmann, Christooph, "LAION-5B An open large-scale dataset for training next generation image-text models", arXiv preprint arXiv2210.08402, 2022, 50 pgs.
Song, Jiaming, "Denoising diffusion implicit models", arXiv preprint arXiv2010.02502, 2020, 22 pgs.
Song, Yang, "Score-based generative modeling through stochastic differential equations", arXiv preprint arXiv2011.13456, 2020, 36 pgs.
Yu, Jiahui, "Scaling Autoregressive Models for Content-Rich Text-to-Image Generation", arXiv preprint arXiv2206.10789, 2022, 49 pgs.
Zhang, Zhixing, "Sine SINgle Image Editing with Text-to-Image Diffusion Models", Proceedings of the IEEE Cvf Conference on Computer Vision and Pattern Recognition, 2023, 6027-6037.
"U.S. Appl. No. 18/400,677, Notice of Allowance mailed Jan. 6, 26", 11 pgs.
"U.S. Appl. No. 18/434,411, Non Final Office Action mailed Dec. 18, 25", 24 pgs.
"International Application Serial No. PCT/US2024/029093, International Preliminary Report on Patentability mailed Dec. 11, 25", 9 pgs.
"International Application Serial No. PCT/US2024/029294, International Preliminary Report on Patentability mailed Dec. 11, 25", 10 pgs.
"International Application Serial No. PCT/US2024/030384, International Preliminary Report on Patentability mailed Dec. 11, 25", 10 pgs.
"International Application Serial No. PCT/US2024/030601, International Preliminary Report on Patentability mailed Dec. 11, 25", 10 pgs.

* cited by examiner

LOSS DETERMINATION FOR LATENT DIFFUSION MODELS

CLAIM OF PRIORITY

This application claims the benefit of priority to U.S. Provisional Application Ser. No. 63/504,563, filed on May 26, 2023, which is incorporated herein by reference in its entirety.

TECHNICAL FIELD

The present disclosure relates generally to machine learning models, and more specifically to text-to-image machine learning models.

BACKGROUND

As the popularity of Artificial Intelligence (AI) grows, companies use machine learning models in various ways, which is transforming how we process, analyze, and interact with visual data. The use of AI in image processing involves training algorithms, particularly deep learning models like Convolutional Neural Networks (CNNs), to perform tasks that range from low-level image manipulation to high-level understanding and generation of visual content. Some prominent applications of AI in images include image classification, object detection, image segmentation, facial recognition, and style transfer.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
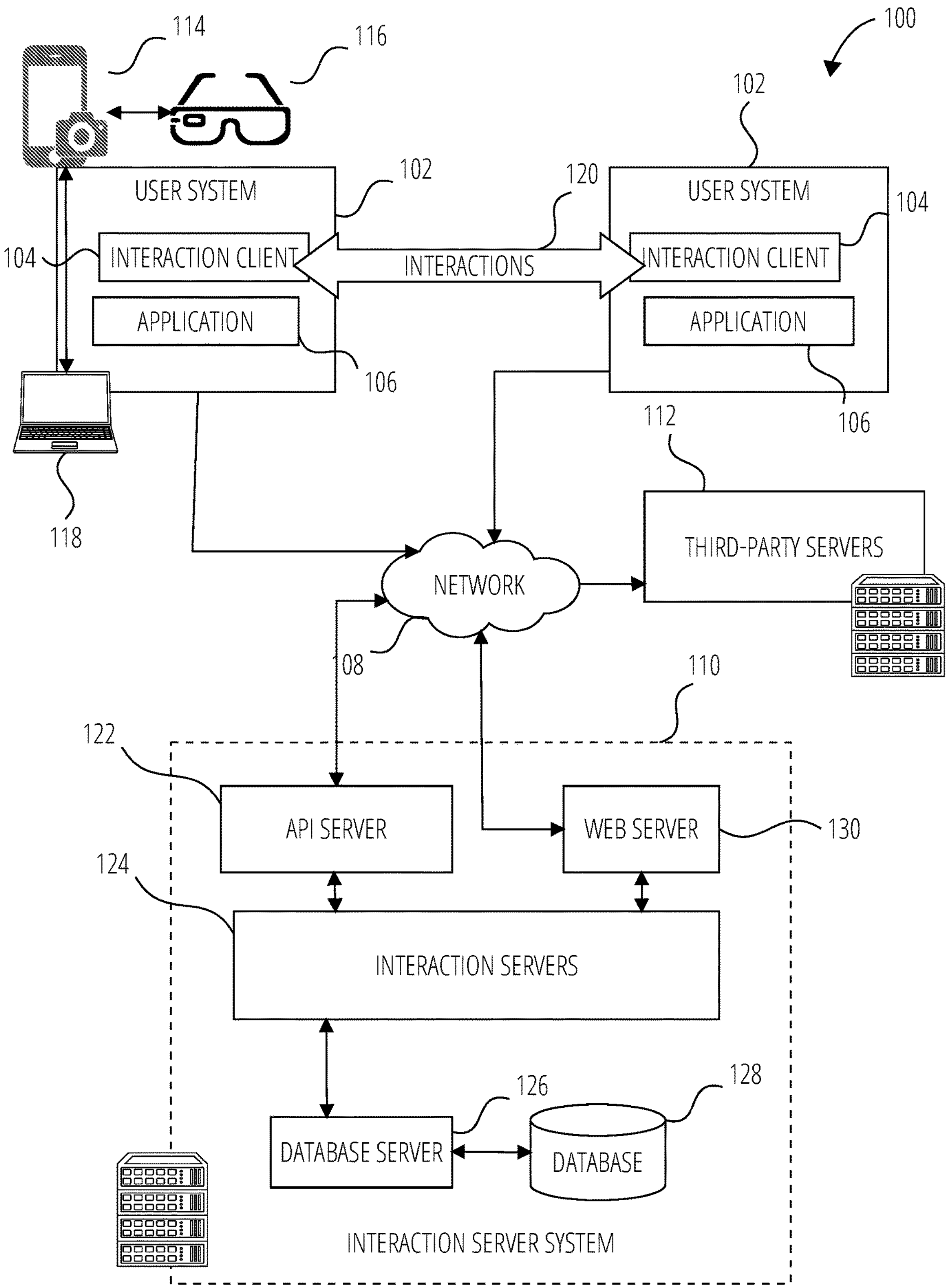
FIG. 1 is a diagrammatic representation of a networked environment in which the present disclosure may be deployed, according to some examples.

Text-to-image machine learning models generate images based on textual descriptions. These models utilize deep learning techniques and are trained on large datasets of paired text and image examples. During the training phase, the model learns the correlation between textual descriptions and corresponding images. Once trained, the model is used to generate images from textual descriptions. The generated image may not be an exact replica of the input description but capture the essence and key elements described in the text.

However, traditional text-to-image diffusion models suffer from several challenges. Traditional models are often large and complex, requiring extensive computational resources. These models typically involve intricate network architectures and numerous denoising iterations, which increase computational complexity.

Moreover, traditional diffusion models are not optimized for individual devices, such as mobile phones. Computational requirements and complex architectures make the models impractical to run on resource-constrained mobile platforms.

Another challenge is high computational costs. Running such models requires high-end Graphics Processing Units (GPUs) and often relies on cloud-based inference, restricting scalability and accessibility.

Using cloud-based inference also involves sending user data to third-party servers, which raises privacy concerns as sensitive information is exposed to external entities. Users may be hesitant to share their data, especially when dealing with personal or confidential content.

Furthermore, the extensive number of denoising steps in traditional models contributes to long inference times. This delay hampers real-time applications, interactive experiences, or scenarios where quick generation of images from textual descriptions is required or desired.

Due to the aforementioned challenges, traditional text-to-image diffusion models remain confined to a limited number of platforms with access to high-end hardware and computational resources. This restricts the widespread adoption of these powerful models.

Example interaction systems described herein apply various modifications to machine learning models that mitigate and/or eliminate the pitfalls of traditional stable diffusion models in the context of text-to-image generation. Some variations involve retraining an existing machine learning model, whereas other variations involve architectural and functional changes to the machine learning models.

In some cases, the interaction systems retrain a stable diffusion machine learning model that has been trained to perform iterative denoising. In some cases, the interaction systems employs a distillation process on stable diffusion machine learning models to reduce the number of denoising iterations. The system identifies an original model that has already been retrained to generate images from text prompts. The system accesses or generates a modified version of the original model, such as by modifying a particular block, node, layer, or channel of the model. Both the original model (referred to herein as the teacher model) and the modified model (referred to herein as the student model) are both used to process the same input information, but with the original model processing the input information through more iterations. The output of the original teacher model is used as training data for the modified student model. As such, the student model is fine-tuned to generate images using a smaller number of iterative denoising computations, reducing latency and computational requirements of the model.

In some cases, the interaction systems apply a different loss function than traditional stable diffusion models. Typically, traditional loss functions consider the disparity between the expected output and the actual output generated by the model. However, these conventional loss functions may not effectively capture the nuances required for optimal image generation performance, as they solely focus on simple differences.

To address this limitation, the described interaction systems dynamically apply specific loss functions during each iteration of the training process. By adaptively applying different loss functions, the systems achieve a higher level of correspondence between the provided text description and the generated image. This adaptive approach allows for a more comprehensive evaluation and optimization of the model, leading to improved image generation results. Moreover, in some cases, the systems apply a new loss function based on a factor that does not consider the input prompt. Such as classifier-free loss factor improves the performance of the overall stable diffusion model.

In conclusion, text-to-image machine learning models have the potential to generate images based on textual descriptions, capturing the essence and key elements described in the text. However, traditional stable diffusion models face challenges related to computational complexity, limited platform compatibility, high costs, privacy concerns, and long inference times. The described interaction systems herein offer solutions to address these challenges.

By retraining and optimizing machine learning models, such as stable diffusion models, the interaction systems adapt the architecture and fine-tune the models. This results in accelerated inference, improved latency, reduced computational requirements, and maintained generative performance. Additionally, by modifying individual loss functions, the systems enable a more nuanced evaluation of image generation, enhancing the correspondence between text descriptions and generated images.

These advancements make text-to-image generation accessible on various devices, including mobile platforms. By mitigating the limitations of traditional models, the interaction systems pave the way for faster, more efficient, and higher quality text-to-image generation, empowering users to create visual content effortlessly.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an image generation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the other interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 hosts multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different applications 106 (or applets) can vary based on how the menu is launched by the user (e.g., from a conversation interface or from a non-conversation interface).

System Architecture

Figure 2:
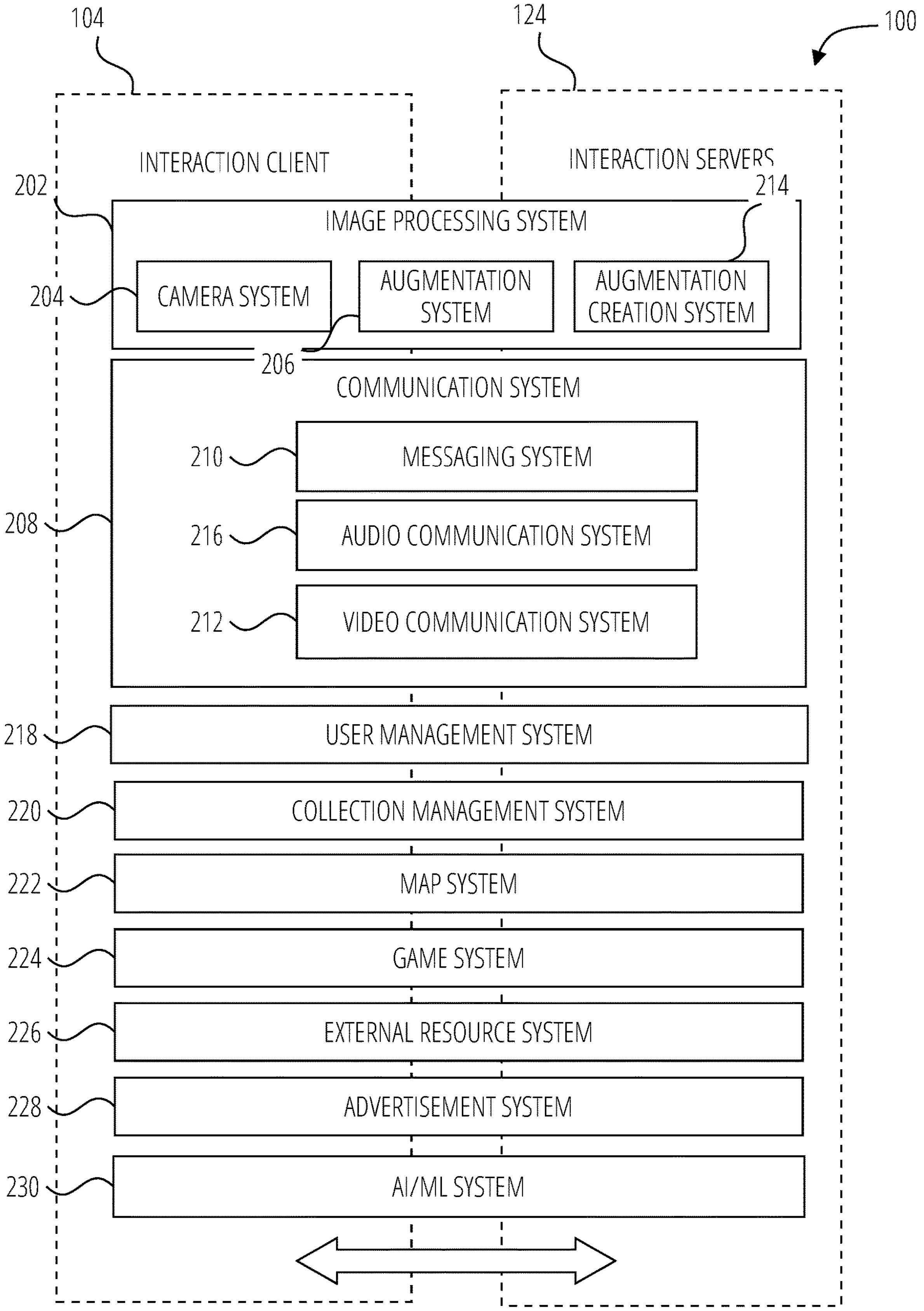
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

- Function logic: The function logic implements the functionality of the microservice subsystem, representing a specific capability or function that the microservice provides.
- API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.
- Service discovery: Microservice subsystems may find and communicate with other microservice subsystems of the interaction system 100. Service discovery mechanisms enable microservice subsystems to locate and communicate with other microservice subsystems in a scalable and efficient way.
- Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1202 of a user system 102. These augmentations are selected by the augmentation system 206 and presented to a user of an interaction client 104, based on a number of inputs and data, such as for example:

- Geolocation of the user system 102; and
- Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 hosts a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230) may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
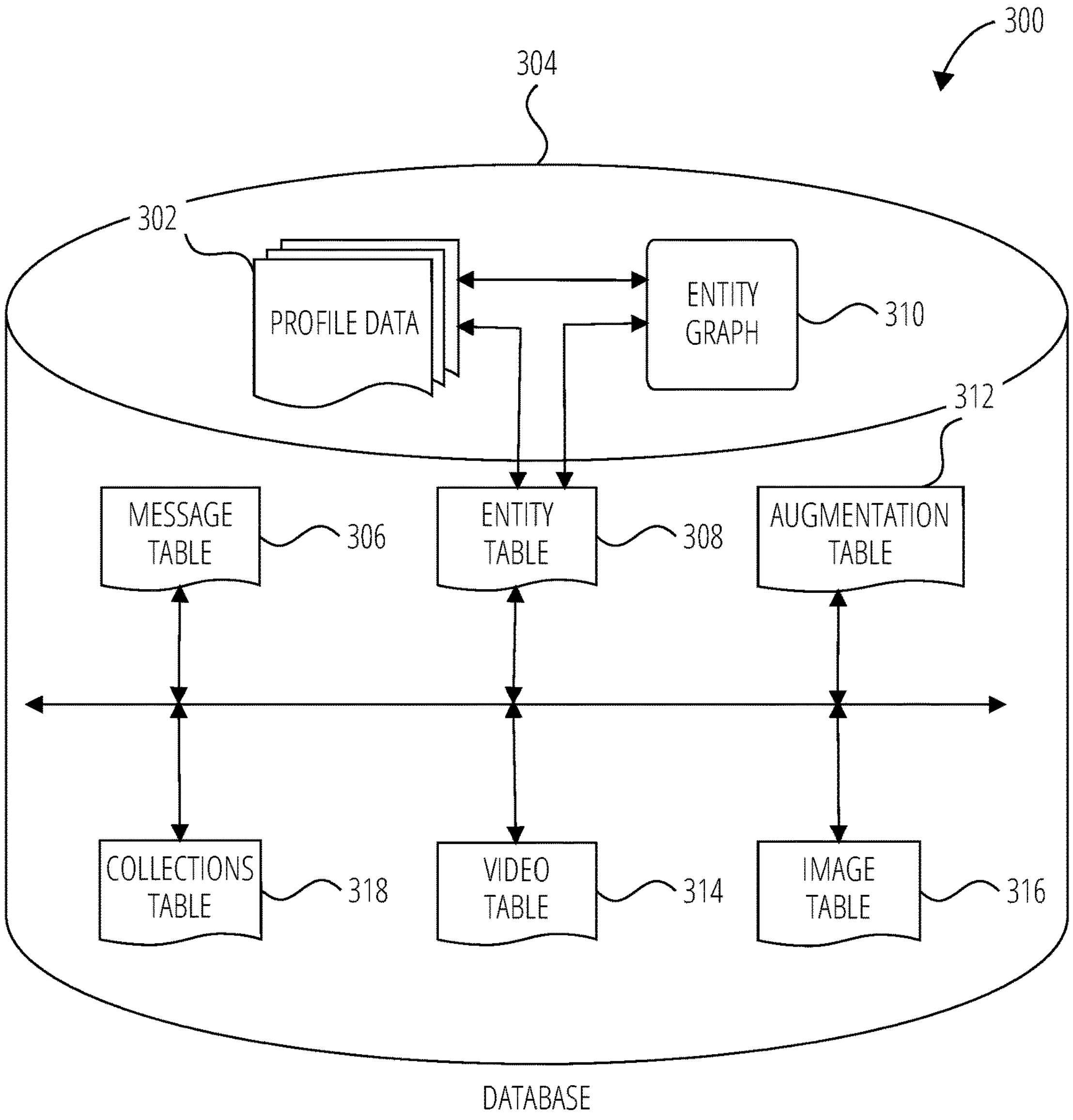
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, the system operating within the interaction client 104 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Overview

Text-to-image diffusion models create images from natural language descriptions that rival the work of professional artists and photographers. However, these traditional models are large, with complex network architectures and require many denoising iterations, making them computationally expensive and slow to run. As a result, high-end GPUs and cloud-based inferences are required to run diffusion models at scale. This approach is costly and has privacy implications, especially when user data is sent to a third party.

To overcome these challenges, the interaction systems described herein modify and/or retrain existing traditional models to mitigate and/or eliminate these pitfalls by introducing an efficient network architecture and improving step distillation. In some cases, the interaction systems enhance step distillation by exploring training strategies and introducing regularization from classifier-free guidance.

Diffusion-based text-to-image models show remarkable progress in synthesizing photo realistic content using text prompts. These models profoundly impact content creation, image editing and in-painting, super-resolution, video synthesis, 3D assets generation, and/or the like. However, This impact comes at the cost of the substantial increase in the computation requirements to run such models. As a result, to satisfy the necessary latency constraints, large scale cloud-based inference platforms with high-end GPU are required. This incurs high costs and brings potential privacy concerns, motivated by the sheer fact of sending private images, videos, and prompts to a third-party service.

There are emerging efforts attempting to speed the inference process of text-to-image diffusion models on mobile devices. Recent works use quantization or GPU-aware optimization to reduce the run time. While these methods effectively achieve a certain speed-up on mobile platforms, the latency does not allow for a seamless user experience. Moreover, none of the existing studies systematically examine the generation quality of on-device models through quantitative analysis.

In some cases, interaction systems apply a text-to-image diffusion model that generates an image on a mobile device in a very short amount of time (such as less than 2 seconds). These models improve the slow inference speed of the UNet (described further herein) and reducing the number of necessary denoising steps.

First, the interaction systems explore training strategies for step distillation, such as by identifying the best teacher model for training the on-device student model. As such, these models can generate a 512×512 image from text on mobile devices in only less than 2 seconds with image quality similar to the original stable diffusion models. The interaction systems improve the learning objective during step distillation by proposing additional regularization, including losses from the v-prediction and classifier-free guidance.

The interaction systems described herein include a number of contributions to address the aforementioned challenges. The interaction systems analyze the importance of each block in the UNet architecture and identify the redundant ones. The interaction systems evolve the training and retraining framework of such models to obtain an efficient UNet that performs similarly to the original stable diffusion model while being significantly faster.

Stable Diffusion Models

Diffusion models gradually convert the sample x from a real data distribution $p_{data}(x)$ into a noisy version, (e.g., the diffusion process), and learn to reverse this process by denoising the noisy data step by step. The model transforms a simple distribution (e.g., random Gaussian noise) to a desired more complicated distribution (e.g., real images). Specifically, given a (noise-prediction) diffusion model $\hat{\epsilon}_\theta(\cdot)$ parameterized by θ, which is typically structured as a UNet, the training can be formulated as the following noise prediction problem:

$$\min_\theta \mathbb{E}_{t\sim U[0,1], x\sim p_{data}(x), \epsilon\sim\mathcal{N}(0,I)} \|\hat{\epsilon}_\theta(t, z_t) - \epsilon\|_2^2,$$

where t refers to the time step; $\epsilon$ is the ground-truth noise; $z_t=\alpha_t x+\sigma_t\epsilon$ is the noisy data; $\alpha_t$ and $\sigma_t$ are the strengths of signal and noise, respectively, decided by a noise scheduler. A trained diffusion model generates samples from noise with various samplers. For example, DDIM are used to sample with the following iterative denoising process from t to a previous time step t':

$$z_{t'} = \alpha_{t'}\frac{z_t - \sigma_t\hat{\epsilon}_\theta(t, z_t)}{\alpha_t} + \sigma_{t'}\hat{\epsilon}_\theta(t, z_t),$$

where $z_{t'}$ will be fed into $\hat{\epsilon}_\theta(\cdot)$ again until t' becomes 0 (e.g., the denoising process finishes).

Latent Diffusion Models

The interaction systems apply latent diffusion models (LDMs). Such LDMs reduce the inference computation and steps by performing the denoising process in the latent space. The latent space is encoded from a pre-trained variational autoencoder (VAE).

During inference, the image is constructed through the decoder from latent features. LDM also performs text-to-image generation, where a text prompt embedding c is fed into the diffusion model as condition.

When synthesizing images, the interaction system applies a classifier-free guidance to improve quality, such as by applying the following equation:

$$\tilde{\epsilon}_\theta(t, z_t, c) = w\hat{\epsilon}_\theta(t, z_t, c) - (w-1)\hat{\epsilon}_\theta(t, z_t, \emptyset),$$

where $\hat{\epsilon}_\theta(t, z_t, \emptyset)$ $\hat{\epsilon}_\theta(t, z_t, \emptyset)$ represents the unconditional output obtained by using null text Ø. The guidance scale w is adjusted to control the strength of conditional information on the generated images to achieve the trade-off between quality and diversity. LDMs are further trained on large-scale datasets, delivering a series of Stable Diffusion models.

Architecture for Latent Text-to-Image Diffusion Model

Figure 4:
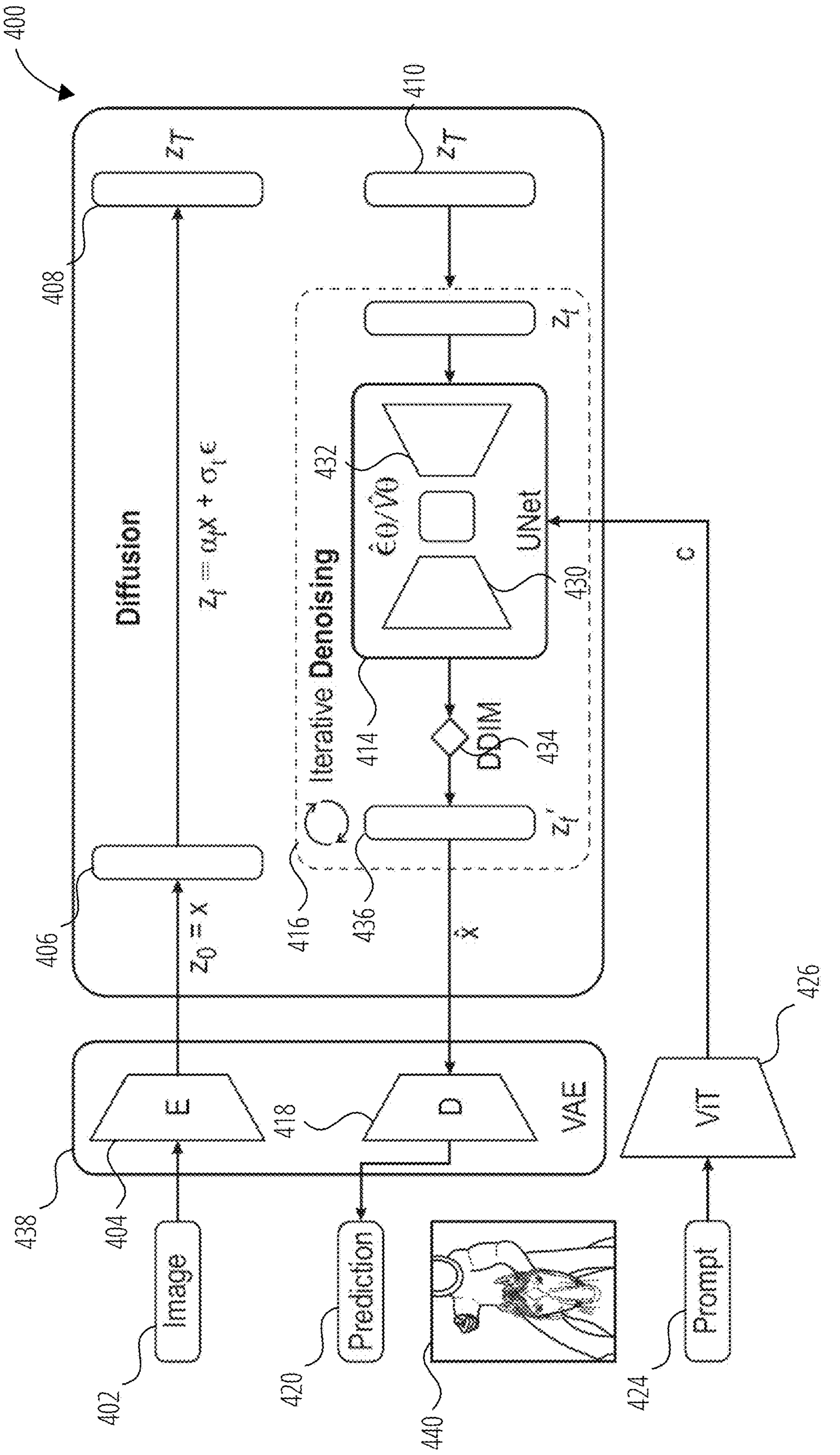
FIG. 4 illustrates an architecture for a stable diffusion model, according to some examples.

FIG. 4 illustrates an architecture 400 for a stable diffusion model, according to some examples. In the architecture 400, an interaction client 104 inputs a prompt 424 into the latent diffusion model. The prompt 424 is processed by a Vision Transformer (ViT) 426.

The interaction client 104 includes a user interface or application that allows a user to input a textual prompt 424. The prompt 424 includes a text entered by the user describing the desired image characteristics, such as, "a cute puppy sitting in a field".

Identifying the prompt for a first user includes receiving a question or request from the first user via text or speech. The interaction client 104 identifies keywords from the prompt and applies weights to each of the identified keywords. The interaction client 104 applies the identified keywords and corresponding weights to a machine learning model.

In some examples, the interaction client 104 generates the prompt for the first user automatically based on an intent identified from real-time interaction data captured by the first interaction client. The interaction client 104 generates prompts for a user based on a user's past activity, interests, and behavior patterns. The interaction client 104 generates personalized prompts related to topics the user may find appealing, such as if a user frequently interacts with a certain type of content about technology.

In some examples, the interaction client 104 uses popular or trending topics from the platform or the wider internet to create prompts that are likely to be of interest to a broad audience. In some examples, by utilizing a user's geographic location, the interaction client 104 can generate prompts that are relevant to their local area, such as events, news, or cultural topics. In some examples, the interaction client 104 can create prompts based on the time of day, season, or upcoming events or holidays, such as events that are time sensitive. In some examples, the interaction client 104 can use the user's social connections to generate prompts related to their friends, family, or other users they follow, such as a birthday or new connection with another user. In some examples, based on the user's activity within a specific application or AR experience, the interaction client 104 can generate prompts related to that context.

In some examples, the interaction client 104 can use the user's in-application actions, such as likes, comments, and shares, to generate prompts related to their interests. For example, if a user frequently interacts with content about cooking in a recipe application, the interaction client 104 may generate a prompt for the user's favorite dish to prepare at home. In some examples, by utilizing sensors and data from the user's mobile device or AR headset, the interaction client 104 creates context-aware prompts based on their physical environment. In some examples, the interaction client 104 can generate prompts based on real-time events occurring within the application or AR experience, such as a live-streamed event. In some examples, the real-time interaction data includes a current camera feed from a camera system of the first interaction client 104.

In some examples, the interaction client 104 uses the user's past activity, preferences, and behavior patterns within the application or AR experience to generate a prompt for the user. In some examples, the interaction client 104 gathers user profile information, such as a calendar of appointments or objects detected in a camera feed of an AR device to generate a prompt. In some examples, by incorporating gamification elements, the interaction client 104 creates prompts that encourage user participation and engagement, such as checking on a feature within a game.

FIG. 4 is described as being performed by certain systems or applying certain processes, such as a particular machine learning model (e.g., stable diffusion model), but the processes described herein can be performed by one or more other or the same machine learning models, computer vision models, other models, or a combination thereof.

In a prompt Vision Transformer ViT, the text prompt is converted to features in the latent space. The interaction client 104 encodes textual instructions using the ViT into a representation that can be understood by the stable diffusion model.

In some cases, the ViT architecture includes a text encoder. To convert the text prompt to features in the latent space, the text encoder utilizes one or more techniques, such as tokenizing the text prompt into subword units or individual tokens and then mapping them to embedding vectors. These embeddings capture the semantic and contextual information of the text. The text encoder then applies transformer layers to refine the embeddings and generate a representation in the latent space specific to the provided text prompt.

A stable diffusion model is a probabilistic generative model used in machine learning for tasks like image generation and denoising. The ViT is a specific type of neural network architecture designed for computer vision tasks, and it's particularly well-suited for processing visual data. Although examples described herein explain features as applied to a ViT, it is appreciated that such features can be applied to other transformer-based architectures (e.g., in a stable diffusion model, such as for different types of data or tasks).

In some cases, a text transformer is used that is pre-trained on textual data for natural language understanding and generation tasks. In some cases, an audio transformer is used that is adapted for audio processing and is trained to work with audio signals and in speech recognition and generation tasks. In some cases, a graph transformer is used when dealing with structured data represented as graphs to model relationships between nodes in the graph.

In some cases, a time series transformer is used for time series data to handle sequential data effectively and capture temporal dependencies in the data. In some cases, a multi-modal transformer is used that can process and integrate information from different sources. In some cases, custom transformers are used, which are custom designed transformer architectures tailored to specific needs and the model's architecture, attention mechanisms, and input embeddings are adjusted to suit the application.

By converting text prompts to features in the latent space, the stable diffusion model controls image generation based on textual instructions. The stable diffusion model includes an input layer 438 and an iterative denoising process 416. The input layer 406 inputs random noise into the iterative denoising process 416.

The input layer is a component of the model responsible for receiving random noise. Random noise is essentially a source of randomness that is introduced into the model. This noise is important because the noise allows for diversity in the generated outputs. The noise acts as a bit of randomness to the generation process, ensuring that the stable diffusion model doesn't generate the same output every time the model is used with the same text prompt.

The iterative denoising process of the stable diffusion model is a multi-step procedure where the model gradually refines the random noise and text-based latent features to generate high-quality images. This process typically involves multiple iterations or steps, where the model incrementally enhances the initial random noise and the latent features from the text prompt. With each step, the generated image becomes clearer and more faithful to the provided textual instructions.

The stable diffusion model operates in two main stages: forward diffusion and reverse diffusion. These stages are designed to control the generation and quality of images. The forward diffusion stage is the initial step, and it begins with an existing input image.

In the forward diffusion stage, the input image (such as input image 402) is processed through an encoder (such as encoder 404). The encoder processes the image to extract meaningful features from the input image and represent them in a lower-dimensional latent space. This latent space representation contains essential information about the image's content and characteristics.

After encoding the input image, the features extracted from the image are then input into an input layer 406 At this stage, the model begins to introduce random noise gradually into the latent features. This introduction of noise is a key aspect of the diffusion process.

The introduction of noise is progressive and controlled. It starts with a small amount of noise and gradually increases. As the noise level rises, the latent features representing the image become less informative and more random. This is a deliberate and systematic process designed to transform the encoded image features into a state of complete randomness.

These features are inputted into an input layer 406 where noise is gradually introduced until the image becomes complete random noise. The forward diffusion stage continues until the latent features, which initially represented the input image, evolve into a state of complete random noise. In essence, the input image is "diffused" into randomness during this process. The image gradually loses its original content and structure. The noisy image is sent to a buffer 408 and either repeats the addition of noise or sends the finalized noisy image to a buffer 410 for the denoising process.

In the reverse process, the interaction client 104 gradually removes the predicted noise to recover feature data via an iterative denoising process 416. The iterative denoising process 416 includes an input layer, a UNet 414, a Denoising Diffusion Implicit Model (DDIM) scheduler 434, and an output layer 436. The reverse process of a stable diffusion model recovers meaningful feature data from the random noise introduced during the forward diffusion stage. This is achieved through an iterative denoising process.

The iterative denoising process 416 is repeated by processing data from the input layer through the UNet 414 and to the output layer 436. The DDIM scheduler 434 schedules the iterations of denoising. The denoising process is repeated by updating the time t. This process is repeated several times to gradually remove the predicted noise and recover the original or meaningful features from the data.

The iterative denoising process begins with an input layer. Here, the data from the forward diffusion stage, which includes the random noise and any available information, is provided as input to initiate the denoising process. The UNet includes a neural network architecture commonly used for image segmentation and reconstruction tasks. In the context of the reverse process, the UNet 414 is employed to aid in the reconstruction of meaningful feature data from the noisy input.

The DDIM scheduler orchestrates the iterations of the denoising process by controlling the timing and frequency of denoising steps. The DDIM scheduler guides the denoising process in a stable diffusion model.

After processing data through the UNet and other components, the stable diffusion model generates and/or outputs the denoised or recovered feature data at the output layer 436. The output at this stage becomes progressively more refined and closer to the original input as the iterative denoising process continues.

The denoising process is repeated by updating the parameter representing time, denoted as "t." This updating of time allows the model to control the pace and depth of the denoising at each iteration, ensuring a gradual and controlled recovery of meaningful features.

The reverse process essentially counteracts the forward diffusion by removing the introduced noise and restoring the original or meaningful data. It does so through an iterative and controlled denoising process orchestrated by the DDIM scheduler, with the UNet playing a crucial role in feature recovery. This entire process ensures that the model can generate high-quality and controlled outputs, even when starting from a state of randomness.

Once a number of iterative denoising processes 416 are completed, the features are outputted from the output layer 436 and into a decoder 418. The decoder is trained to receive features as input and make a prediction 420, such as generating an image 440 that corresponds to the received features.

In stable diffusion models, the UNet 414 is a key component used in the image decoder 418. UNet is a type of convolutional neural network (CNN) architecture that is employed for tasks such as image segmentation and image-to-image translation.

The UNet architecture includes an encoder-decoder structure with a downsampler 432, a middle layer 430, and an upsampler. The downsampler 432 performs downsampling operations, reducing the spatial dimensions of the input image while increasing the number of feature channels. This process extracts hierarchical and abstract features from the input image. Each downsampled layer in the encoder is connected to a corresponding layer in the middle layer 430 and the upsampler.

The upsampler part of the UNet 414 performs upsampling operations to reconstruct features in the latent space by upsampling the encoded features. The decoder 418 of the VAE combines these features with the skip connections to recover spatial details and generate a high-resolution output image. The skip connections aid in preserving fine-grained details by providing additional contextual information to the decoder layers.

The time-conditional (t) UNet 414 includes machine learning model blocks, such as cross-attention and ResNet blocks. A cross-attention mechanism is employed at each stage to integrate text embedding (c) into spatial features:

$$\text{Cross-Attention}(Q_{z_t}, K_c, V_c) = \text{Softmax}\left(\frac{Q_{z_t} \cdot K_C^T}{\sqrt{d}}\right) \cdot V_c,$$

where Q is projected from noisy data $z_t$, K and V are projected from text condition, and d is the feature dimension. UNet also uses ResNet blocks to capture locality. The forwarding of UNet is:

$$\hat{\epsilon}_\theta(t, z_t) = \prod \{\text{Cross-Attention}(z_t, c), ResNet(z_t, t)\}.$$

Although examples described herein apply features to UNet, cross-attention blocks, ResNet blocks, and/or a combination thereof, it is appreciated that such features apply to other components of a machine learning model, a stable diffusion model, other types of models processing images or text, and/or the like.

In some cases, the features described herein apply to U-Net++ which is an extension of the UNet architecture that addresses gradient vanishing and uses nested skip pathways to capture multiscale features more effectively. In some cases, the features apply to SegNet which is an architecture designed for semantic segmentation tasks and uses an encoder-decoder structure with pooling indices for upsampling, which makes it memory—efficient. In some cases, the features apply to PSPNet (Pyramid Scene Parsing Network) which leverages pyramid pooling modules to capture contextual information at multiple scales and is effective for tasks that require understanding the global context of an image.

In some cases, features are applied to LinkNet which is a lightweight architecture for real-time image segmentation. In some cases, features are applied to a FCN (Fully Convolutional Network) for semantic segmentation by replacing fully connected layers with convolutional layers, enabling end-to-end pixel-wise prediction.

In some cases, features are applied to self-attention transformers, such as by avoiding cross-attention. In some cases, features are applied to non-local neural networks that introduce non-local operations to capture long-range dependencies in data. In some cases, features are applied to graph Neural Networks (GNNs) that are well-suited for modeling structured data, such as graphs or meshes.

In some cases, features are applied to spatial transformers that are neural network components that learn to spatially transform feature maps. In some cases, features are applied to convolutional blocks with dilated convolutions which can be used to increase the receptive field of convolutional layers, capturing contextual information without cross-attention.

In some cases, features are applied to DenseNet which connects each layer to every other layer in a feed-forward fashion helping to alleviate vanishing gradient problems and encouraging feature reuse. In some cases, features are applied to inception modules that use parallel convolutional operations of different kernel sizes to capture multi-scale features within a single layer. In some cases, features are applied to Xception which is an extension of the Inception architecture that replaces the standard convolutional layers with depthwise separable convolutions.

Although examples described herein explain a model, such as a stable diffusion model, generating an image, it is appreciated that features described herein also apply to models generating media content items that can include:

- Content augmentations to enhance images, videos, or other media content items to share with others, such as by adjusting the color or appearance or adding interactive elements such as animations and facial transformations, in real-time.
- Emojis that are small images or icons that represent emotions, reactions, or objects.
- Stickers are larger images or animations that can be sent in a chat window.
- Images or photographs can be sent to other users to share visual information or document a particular event.
- Video clips can be used to share recorded content or document a particular event.
- Audio messages can be shared to communicate audible communication.
- Graphics Interchange Formats (GIFs) are short animations that can be used to add humor or express emotions.

Systems and methods described herein include training a machine learning network, such as training the stable diffusion model described herein. The machine learning network can be trained to generate image from prompts received from the user.

Training a stable diffusion model includes combining principles of generative modeling and neural network training to enable controlled data generation or manipulation. This training procedure involves two main stages: forward diffusion and reverse diffusion.

During the forward diffusion stage, an input data point, such as an image, is gradually transformed into random noise by adding noise in a controlled manner. This process begins with a low level of noise and progressively increases it. The noisy data is then encoded using a neural network, capturing its features.

In the reverse diffusion stage, the encoded noisy data is iteratively denoised to reconstruct the original data. The model learns to remove noise and recover meaningful features guided by a pre-defined loss function, which measures the quality of the reconstruction. This process is repeated iteratively until the data is successfully restored or generated. Training a stable diffusion model requires careful selection of architectural components, loss functions, and optimization techniques to achieve the desired data generation or manipulation capabilities.

Training of models, such as artificial intelligence models, is necessarily rooted in computer technology, and improves modeling technology by using training data to train such models and thereafter applying the models to new inputs to make inferences on the new inputs.

Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new and unseen data (such as new prompt data) and make predictions that the model was trained for based on the weights or scores that were adjusted during training. Such training of the machine learning models described herein reduces false positives and increases the performance of such stable diffusion models.

Improved Step Distillation for Latent Diffusion Models

Figure 5:
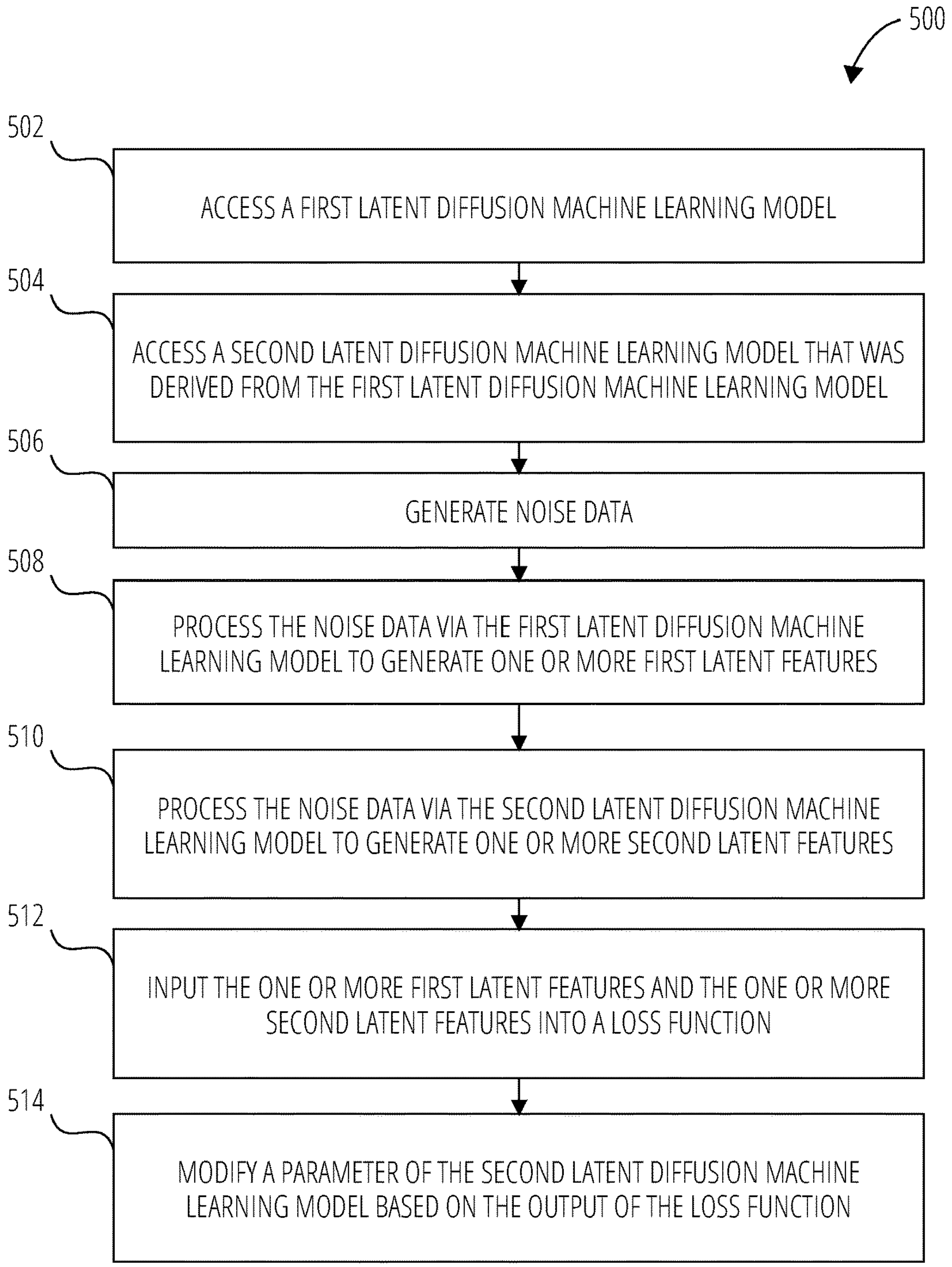
FIG. 5 illustrates an example method for improved step distillation for latent diffusion models, according to some examples.

FIG. 5 illustrates an example method 500 for improved step distillation for latent diffusion models, according to some examples. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At block 502, the interaction system (such as interaction system 100) accesses a first latent diffusion machine learning model. The first latent diffusion machine learning model is already pretrained to perform a first number of denoising steps. Latent diffusion models (LDMs) include a class of diffusion probabilistic model-based generative models that are trained for high-resolution image synthesis and manipulation.

These LDMs apply a diffusion process whereby in the forward process, noise is injected progressively into an initial latent representation of a real image, effectively blurring the image over time. In the reverse process, the LDMs learn to reverse the noise addition (as further described herein, such as in FIG. 4).

Figure 6:
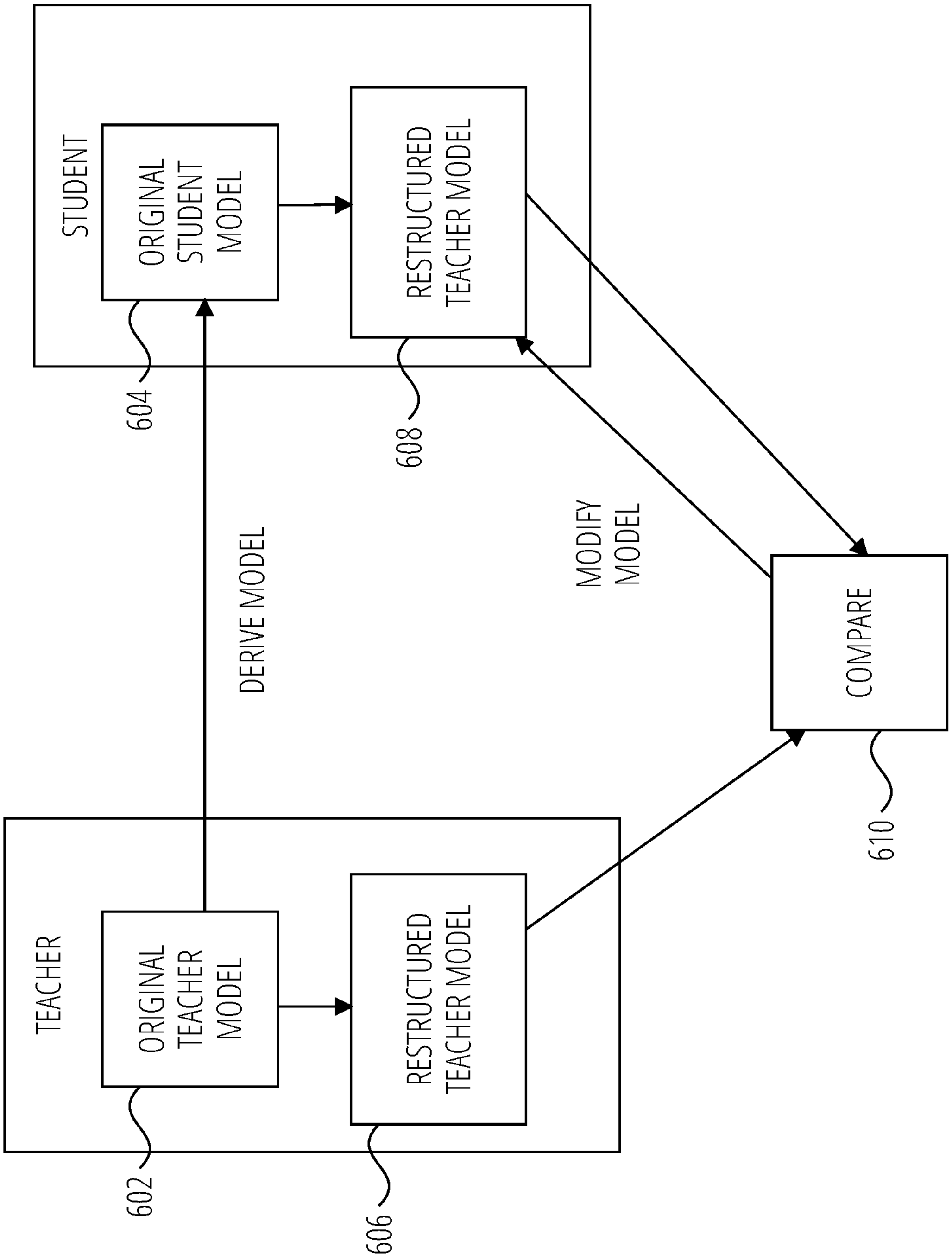
FIG. 6 illustrates an architecture that applies a derived machine learning model from an original machine learning model and trains the derived machine learning model using the original machine learning model, according to some examples.

FIG. 6 illustrates an architecture that applies a derived machine learning model from an original machine learning model and trains the derived machine learning model using the original machine learning model, according to some examples. The first latent diffusion machine learning model can include the original teacher model 602 of FIG. 6.

At block 504, the interaction system accesses a second latent diffusion machine learning model that was derived from the first latent diffusion machine learning model. The second latent diffusion machine learning model is derived from the first model and then is retrained to perform a second number of denoising steps. The second latent diffusion machine learning model can include the original student model 604 of FIG. 6.

In some cases, the first latent diffusion machine learning model is restructured to perform a different number of denoising steps than the original first latent diffusion machine learning model. The first latent diffusion machine learning model can include a first number of denoising steps. The restructured teacher model 606 can perform fewer denoising steps than the original teacher model, such as half the number of denoising steps.

The interaction system can restructure the first latent diffusion machine learning model to perform a third number of denoising steps. The first number of denoising steps can be larger than the third number of denoising steps. For example, the third number of denoising steps is half the first number of denoising steps. In other words, the first latent diffusion machine learning model can include 32 denoising steps, whereas the restructured first latent diffusion machine learning model can have 16 denoising steps.

In some cases, the second latent diffusion machine learning model includes a second number of denoising steps. The interaction system restructures the second latent diffusion machine learning model to perform a fourth number of denoising steps. The second number of denoising steps can be larger than the fourth number of denoising steps. The fourth number of denoising steps for the second original latent diffusion machine learning model can be half the second number of denoising steps for the original second latent diffusion machine learning model.

In some cases, the fourth number of denoising steps is half the third number of denoising steps. For example, the first latent diffusion machine learning model (corresponding to the first number of denoising steps) has 32 total denoising steps. The restructured first latent diffusion machine learning model (corresponding to the third number of denoising steps) has 16 total denoising steps. The second latent diffusion machine learning model (corresponding to the second number of denoising steps) has 16 total denoising steps. The restructured second latent diffusion machine learning model (corresponding to the fourth number of denoising steps) has 8 total denoising steps.

In some cases, the student model is derived from the teacher model by changing the number of denoising steps. In some cases the student model is derived by restructuring the UNet architecture of the first latent diffusion machine learning model. For example, restructuring the UNet architecture includes changing the architecture of the cross attention and/or ResNet blocks of the UNet architecture, as further described herein.

At block 506, the interaction system generates noise data (as further described in FIG. 4). At block 508, the interaction system processes the noise data via the first latent diffusion machine learning model to generate one or more first latent features. In some cases, the system processes the noise data via the first restructured latent diffusion machine learning model.

At block 510, the interaction system processes the noise data via the second latent diffusion machine learning model to generate one or more second latent features. In some cases, the system processes the noise data via the second restructured latent diffusion machine learning model.

The first latent diffusion machine learning model includes a denoising architecture. The first latent diffusion machine learning model processes the noise data through a number of denoising steps via a number of iterations by transmitting the output of a prior iteration as input to a current iteration of the denoising architecture (see FIG. 8 for further description).

The interaction system processes the noise data via the first latent diffusion machine learning model to generate one or more latent features. The interaction system iteratively processes the noise data via the denoising architecture for a number of denoising steps to generate first latent features, and processes the generated first latent features via a decoder of the first latent diffusion machine learning model to generate the one or more first images.

The interaction system processes the noise data via the second latent diffusion machine learning model to generate one or more latent features. The interaction system iteratively processes the noise data via the denoising architecture for the third number of denoising steps to generate second latent features, and processes the generated second latent features via the decoder of the second latent diffusion machine learning model to generate the one or more first images. For example, the second diffusion machine learning model can include 16 denoising steps, whereas the restructured second latent diffusion machine learning model can have 8 denoising steps.

The restructured teacher model 606 can perform fewer denoising steps than the original teacher model. The restructured student model 608 can perform fewer of denoising steps than the original student model.

The iterative denoising process includes adding random noise and an output image generated during a previous iteration to the machine learning model causing the generation of the output image of the current iteration.

The decoder of the first latent diffusion machine learning model can be the same decoder (or a decoder with the same parameters) as the decoder of the second latent diffusion machine learning model.

Figure 7:
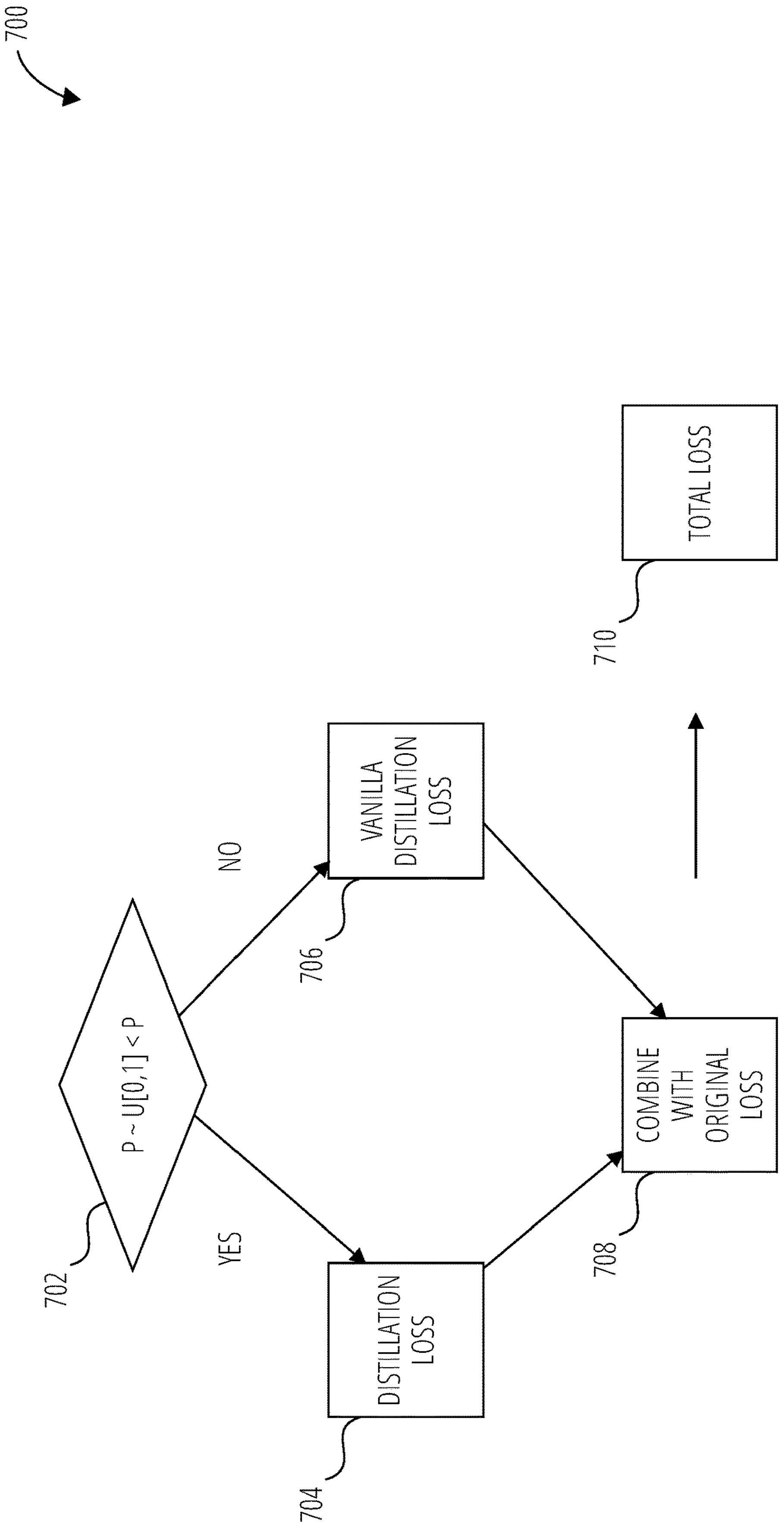
FIG. 7 illustrates an architecture for determining the loss function, according to some examples.

At block 512, the interaction system inputs the one or more first latent features and the one or more second latent features into a loss function. FIG. 7 illustrates an architecture 700 for determining the loss function, according to some examples.

Loss Function Improvement

Example interaction systems described herein improve on the loss function for machine learning models. The loss function includes a distillation loss and an original loss.

The distillation loss objective is determined in the x-space as noted below:

$$\mathcal{L}_{vani\_dst1} = \varpi(\lambda_t)\|\hat{x}_t^{(s)} - \frac{z_{t''} - \frac{\sigma_{t''}}{\sigma_t} z_t}{\alpha_{t''} - \frac{\sigma_{t''}}{\sigma_t}\alpha_t}\|_2^2,$$

where $$\varpi(\lambda_t) = \max\frac{(\alpha_t^2)}{\sigma_t^2},$$

1 is the truncated SNR weighting coefficient. Advantageously, the inference speed is greatly improved. However, using such a loss function results in a degradation of performance for generative images.

The interaction client 104 applies a stable diffusion machine learning model that outputs velocity v instead of the noise ϵ. The interaction client 104 fine-tunes the model with the following original loss$_{Lori}$:

$$\mathcal{L}_{ori} = \mathbb{E}_{t\sim U[0,1], x\sim p_{data}(x), e\sim N(0,1)}\|\hat{v}_\theta(t, z_t, c) - v\|_2^2,$$

where v is the ground-truth target velocity, which can be derived analytically from the clean latent x 173 and noise e given time step t: v≡αtϵ−σtx.

In some cases, the interaction systems apply a classifier-free guidance-aware (CFG-aware) distillation loss objective function. Such classifier-free guidance-aware functions improve the performance of generative images, such as the correlation between generated images and text conditions.

In some cases, the interaction client 104 applies the classifier-free guidance function to one or more machine learning models. For example, if a teacher and student architecture is applied for distilling a machine learning model, interaction client 104 applies the classifier-free guidance function to the teacher model, student model, or both. However, it is appreciated that the interaction client 104 applies the classifier-free guidance in other types of machine learning models and/or distillations.

Specifically, after obtaining the v-prediction output of UNet, the CFG step is added. ^v(s) t is replaced with the following guided version, $$\tilde{v}_t^{(s)} = w\hat{v}_\eta(t, z_t, c) - (w-1)\hat{v}_\eta(t, z_t, \emptyset),$$

where w is the CFG scale. For example, the classifier-free guidance function includes a first portion where the given prompt is applied, and a second portion where an empty prompt is applied. Other traditional systems used guidance based on some prompt. However, some embodiments described herein apply an empty prompt.

The interaction system samples w from a uniform distribution over a range (such as range [2, 14]), which will be shown to provide a way to trade off FID and CLIP score during training.

After replacing the UNet output with its guided version, the interaction client generates a counterpart version of $L_{vani\_dst1}$—described herein as CFG distillation loss, $L_{cfg\_dst1}$.

In some cases, $L_{vani\_dst1}$ helps achieve low FID while $L_{cfg\_dst1}$ helps to achieve a high CLIP score. The interaction client 104 applies a loss mixing scheme that uses the two losses at the same time:

$$\mathcal{L} = \mathcal{L}_{dst1} + \gamma\mathcal{L}_{ori,}$$

$$\mathcal{L}_{dst1} = \mathcal{L}_{cfg\_dst1} \text{ if } P \sim U[0, 1] < p \text{ else } \mathcal{L}_{vani\_dst1},$$

where Lori represents the original denoising loss and γ is its weighting factor, and U[0, 1] represents the uniform distribution over range (0, 1).

The interaction client 104 applies a predefined CFG probability p, indicating the probability of using the CFG distillation loss in each training iteration (e.g., with 1−p probability, the vanilla distillation loss is used), such as in step 702 of FIG. 7. The loss function includes a random probability distribution, where the loss function applies a first type of distillation loss (such as the distillation loss 704) or a second type of distillation loss (such as the vanilla distillation loss 706) based on the random probability distribution.

The first type of distillation loss applies a classifier-free guidance function to determine the distillation loss; the second type of distillation loss does not apply a classifier-free guidance function to determine the distillation loss.

The classifier-free guidance function can be applied to one or more of the outputs for each denoising step. In some cases, the classifier-free guidance function is applied to each of the outputs of the denoising steps.

In some cases, the classifier-free guidance function is applied to each denoising step output for the teacher. In some cases, the classifier-free guidance function is applied to each denoising step output for the student. In some cases, the classifier-free guidance function is applied to each denoising step output for both the teacher and the student.

The distillation loss is combined with the original loss at step 708, and this combination makes up the total loss 710 used to modify the parameter of the student model.

In some cases, the interaction client 104 identifies a prompt of a user, the prompt indicative of an intent of the user for generative images, accesses noise data, and analyzes a collection of data corresponding to the prompt and the noise data using a machine learning model to generate first features.

The interaction client 104 then modifies a characteristic of the first machine learning model to generate a modified machine learning model, analyzes the collection of data corresponding to the prompt and the noise data using the modified machine learning model to generate second features, and compares data corresponding to the first features and the second features using a loss function. The interaction client 104 then adjusts a characteristic of the modified machine learning model based on the comparison.

In some cases, the loss function is based on a noise image. For example, the following velocity is used:

$$\tilde{v}_t^{(s)} = w\hat{v}_\eta(t, z_t, c) - (w-1)\hat{v}_\eta(t, z_t, \emptyset),$$

The $(w-1)\hat{v}_\eta(t, z_t, \emptyset)$, is based on a classifier-free distillation loss objective function whereby this portion of the loss function does not consider the input prompt c. As such, the loss function is at least partially based on a pure noise image.

Traditional systems do not include this function in loss determinations, particularly in step distillation. Traditional systems simply apply the following vanilla loss function:

$$\mathcal{L}_{vani\_dst1} = \varpi(\lambda_t)\|\hat{x}_t^{(s)} - \frac{Z_{t''} - \frac{\sigma_{t''}}{\sigma_t} Z_t}{\alpha_{t''} \frac{\sigma_{t''}}{\sigma_t} \alpha_t}\|_2^2$$

In some examples, the systems herein use an original loss function for step distillation:

$$\mathcal{L}_{ori} = \mathbb{E}_{t \sim U[0,1], x \sim Pdata(x), \epsilon \sim N(0,I)} \|\hat{v}_\theta(t, z_t, c) - v\|_2^2,$$

In some examples, the interaction client 104 applies a combination of loss functions. For example, the interaction client 104 bases the total loss from at least two of: $L_{vani\_dst1}$, $L_{ori}$, or $L_{eft\_dst1}$.

In some cases, the interaction client 104 makes a determination on which losses to add based on a desired characteristic. For example, adding one type of loss may result in an improvement in one type of characteristic. In such an event, the loss that helps to improve that particular characteristic can be added to the total loss.

In some cases, a probability factor determines which loss to add to the total loss feature. For example, the total loss is determined by:

$$\mathcal{L} = \mathcal{L}_{dst1} + \gamma\mathcal{L}_{ori,}$$

$$\mathcal{L}_{dst1} = \mathcal{L}_{cfg\_dst1} \text{ if } P \sim U[0, 1] < p \text{ else } \mathcal{L}_{vani\_dst1}$$

The probability determines whether $L_{cfg\_dst1}$ or $L_{vani\_dst1}$ will be added to the $L_{ori}$ loss to identify the total loss.

In some cases, the one or more loss functions described herein are applied to the training and/or retraining of a single machine learning model. In some cases, the one or more loss functions described herein are applied to the training or retraining when multiple machine learning models are involved. For example, if the interaction system 100 is training a decoder, encoder, UNet, stable diffusion model, and/or the like, the interaction system 100 can modify such models and compare outputs of original models with modified models. In such cases, the interaction system 100 can apply one or more loss functions to the original model and apply one or more loss functions to the modified models.

In some cases, the interaction system applies the one or more loss functions to the original model but uses a traditional loss function for the modified model, and/or vice versa. In some cases, the interaction system applies the one or more loss functions to the student model and/or the teacher model when performing step distillation.

At block 514, the interaction system modifies a parameter of the second latent diffusion machine learning model based on the output of the loss function. In some cases, the loss function can determine a loss between the output of the teacher model and the student model.

In some cases, the interaction system compares the images or latent features to determine the loss by determining a mean squared error indicating how similar an image the second latent diffusion model created as compared with the image created by the first latent diffusion model using a comparison module 610. The interaction system can modify the second latent diffusion model, such as updating the weights of the second latent diffusion model, and rerun the synthetic training data (such as the noise) in order to minimize the mean squared error.

In some cases, the interaction system compares the outputted images using a mean Squared Error (MSE) that calculates the average of the squared differences between corresponding pixels in two images. The MSE provides a measure of the overall pixel-wise difference between the images, with higher values indicating greater dissimilarity.

In some cases, the interaction system compares the outputted images via a Structural Similarity Index (SSIM) that assesses the structural similarity by considering luminance, contrast, and structure. SSIM provides a more comprehensive measure of image dissimilarity, accounting for human perceptual differences.

In some cases, the interaction system compares the outputted images using a Peak Signal-to-Noise Ratio (PSNR) that quantifies the quality of image reconstruction by measuring the ratio of the maximum possible power of a signal (the original image) to the power of corrupting noise (the difference between the images). Higher PSNR values indicate better image quality.

In some cases, the interaction system compares the outputted images using cross-correlation that measures the similarity between two images by sliding one image over the other and computing the dot product at each position. High cross-correlation indicates similarity, while low values suggest dissimilarity.

In some cases, the interaction system compares the outputted images using a histogram comparison that compares histograms of pixel values in two images, which can reveal differences in color or intensity distributions. In some cases, the interaction system compares the outputted images using perceptual metrics that take into account human perception and assess how different the images appear to the human eye.

In some cases, the interaction system compares the outputted images using feature-based comparisons by extracting features from images using techniques like deep neural networks and comparing those feature representations, which can capture more abstract differences between images.

In some cases, one or more weights of the machine learning model are modified based on the comparison of the images. In some cases, the architecture of the machine learning model is changed, such as the UNet or ResNet blocks (as further described herein) based on the comparison.

In some cases, the interaction system modifies diffusion parameters of the machine learning model, which control the diffusion process and include parameters such as diffusion steps and step size. Adjusting these parameters affects how information is propagated through the latent space, influencing the model's ability to capture complex dependencies in the data.

In some cases, the interaction system modifies latent space parameters of the machine learning model, such as the dimensionality and prior distribution, that impact the model's capacity to represent the underlying data structure. Optimizing these parameters involves finding an appropriate balance between model expressiveness and overfitting, and the interaction system can optimize these parameters based on the comparison.

In some cases, the interaction system modifies network architecture parameters of the machine learning model, which govern the neural network architecture, such as the number of layers, hidden units, and activation functions, which play a crucial role in the model's capacity to learn intricate patterns. Tuning these parameters can enhance the model's ability to capture hierarchical features in the data.

In some cases, the interaction system modifies learning rate parameters of the machine learning model, which influence the size of steps taken during optimization. The interaction system can identify proper adjustment of such parameters, whereby a high learning rate may cause the model to converge slowly or not at all, while a low learning rate can lead to slow convergence or getting stuck in suboptimal solutions.

In some cases, the interaction system modifies regularization parameters of the machine learning model, which control the model's complexity and help prevent overfitting. Balancing the strength of regularization is essential for generalization performance on unseen data.

In some cases, the interaction system modifies noise parameters of the machine learning model, which relate to the injection of noise during training, such the type and magnitude of noise, and which impact the model's robustness and ability to handle uncertainties in the data. Fine-tuning these parameters can enhance the model's resilience to noisy inputs.

In some cases, the interaction system modifies batch size parameters of the machine learning model, which determine the number of samples used in each iteration during training. Adjusting these parameters can impact the convergence speed and memory requirements, with larger batch sizes potentially leading to faster convergence but increased memory usage.

In some cases, the interaction system modifies loss function weight parameters of the machine learning model, which adjusts the weights assigned to different components (e.g., reconstruction loss, regularization terms), and which can help strike a balance between competing objectives and guide the model towards desired behavior.

Although examples described herein are applied to a teacher and student model, it is appreciated that other types of models can be applied, such as two models where one model is used as training data for another model, one model that is derived from another model, one model used to help train another model, and/or the like.

The output of the loss function is used to modify the parameter by performing back propagation on the second latent diffusion machine learning model based on the output of the loss function that processes the one or more first latent features of the first latent diffusion machine learning model and the one or more second latent features of the second latent diffusion machine learning model.

The output of the teacher model is used as ground-truth (or training data, the expected output data) to adjust the weights of the student model. For example, the system performs forward propagation on the student model, compares the output of the student and teacher models, and based on the difference or loss, adjusts the weights of the student model via back propagation.

Teacher and Student Architecture for Denoising Iteration

Figure 8:
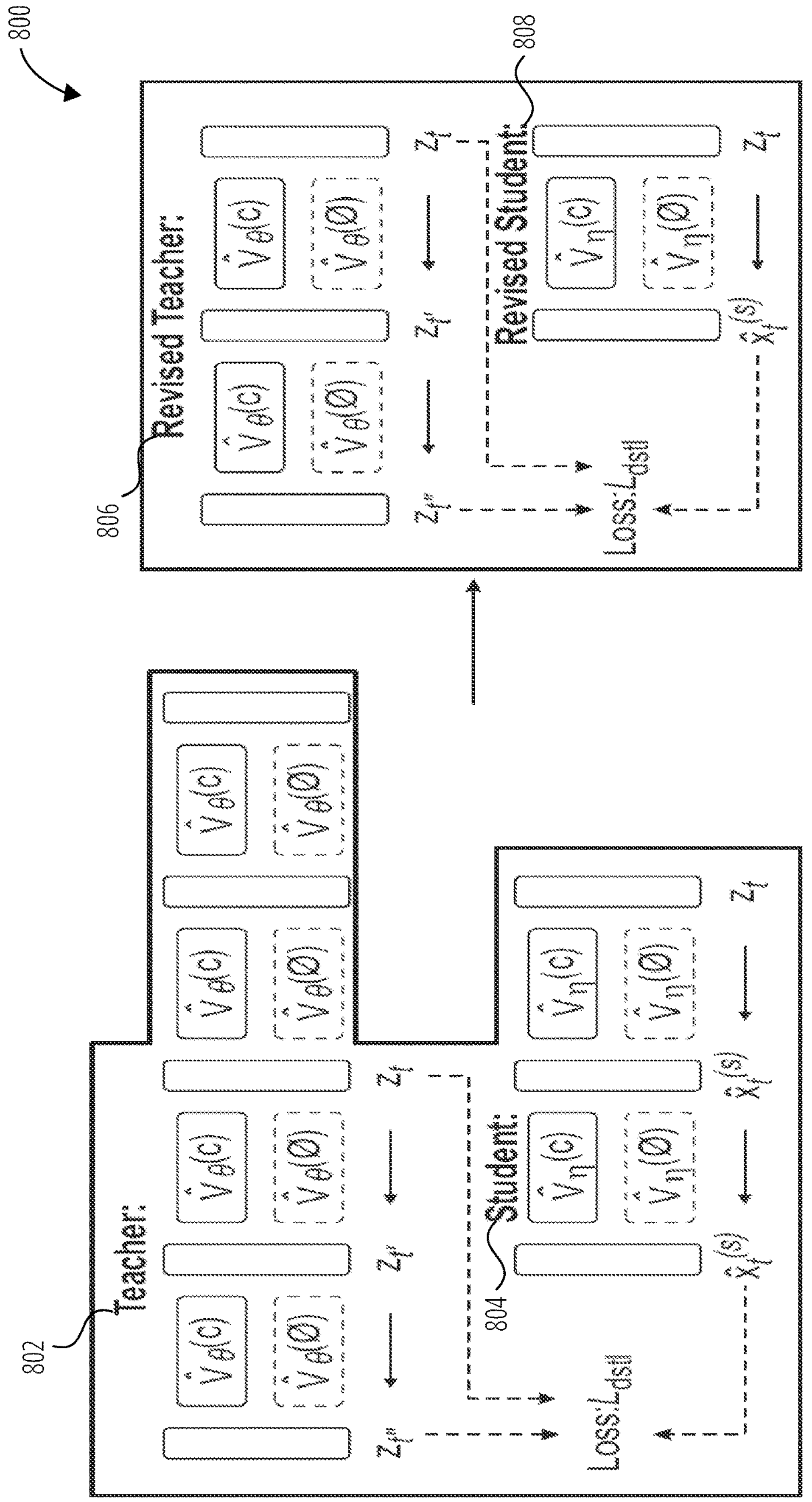
FIG. 8 illustrates a teacher/student distillation architecture, according to some examples.

FIG. 8 illustrates a teacher/student distillation architecture 800, according to some examples. In some examples, the interaction client 104 reduces the number of iterative denoising steps for UNet to reduce latency. The interaction client 104 identifies a first machine learning model 802 (also referred to herein as the teacher model) already trained to perform a certain number of iterative denoising steps. The interaction client 104 generates a copy of the first machine learning model (referred to herein as the second machine learning model, student model) and modifies the second machine learning model 804 to perform a lower number of iterative denoising steps. For example, the teacher model runs 32 steps whereas the student model runs 16 steps.

The outputs of the teacher and the student model are compared to modify parameters of the student model. This process is rerepeated until the student model meets a certain performance threshold. Advantageously, the student model is trained to perform on a lower number of iterative denoising steps.

In some cases, the number of denoising steps for the teacher is reduced to generate a revised teacher model 806, and the number of denoising steps for the student is reduced to generate a revised student model 808.

The interaction client applies a stable diffusion machine learning model that outputs velocity v instead of the noise $\epsilon$. The interaction client 104 fine-tunes the model with the following original loss$_{\mathcal{L}_{ori}}$:

$$\mathcal{L}_{ori} = \mathbb{E}_{t\sim U[0,1], x\sim Pdata(x), \epsilon\sim N(0,I)} \|\hat{v}_\theta(t, z_t, c) - v\|_2^2$$

where v is the ground-truth target velocity, which can be derived analytically from the clean latent x 173 and noise e given time step t: $v \equiv \alpha t \epsilon - \sigma t x$.

The interaction client 104 performs distillation on a preexisting machine learning model that has already been trained to perform a certain number of iterations (e.g., 32 steps). Responsive to the distillation, the interaction client 104 generates a first new machine learning model. This first new machine learning model (also referred to herein as the teacher model) can have a less number of iteration steps for the UNet (e.g., 16 steps).

Second, the interaction client 104 performs distillation on another preexisting machine learning model that has already been trained to perform a certain number of iterations (e.g., 32 steps). This other preexisting machine learning model is a modified version of the preexisting machine learning model, such as an optimized version of the preexisting machine learning model, in order to generate a more efficient preexisting machine learning model. Responsive to the distillation, the interaction client 104 generates a second new machine learning model. This second new machine learning model (also referred to herein as the student model) can have a less number of iteration steps for the UNet (e.g., 16 steps).

Finally, the interaction client applies step distillation on the 16-step teacher model with the 16-step student model. The interaction client 104 generates an 8-step student model.

Given the UNet inputs, time step t, noisy latent $z_t$, and text embedding c, the teacher model performs a number of DDIM denoising steps (such as 2 DDIM steps), from time t to t' and then to t" (0≤t"<t'<t≤1). This process can be formulated as (see the supplementary material for detailed derivations):

$$\hat{v}_t = \hat{v}_\theta(t, z_t, c) \Longrightarrow z_{t'} = \alpha_{t'}(\alpha_t z_t - \sigma_t \hat{v}_t) + \sigma_{t'}(\sigma_t z_t - \alpha_t \hat{v}_t),$$

$$\hat{v}_{t'} = v_\theta(t', z_{t'}, c) \Longrightarrow z_{t''} = \alpha_{t''}(\alpha_{t'} z_{t'} - \sigma_{t'} \hat{v}_{t'}) + \sigma_{t'}(\sigma_{t'} z_{t'} - \alpha_{t'} \hat{v}_{t'}).$$

The student model, parameterized by η, performs a less number of DDIM denoising steps (such as 1 step), $$\hat{v}_t^{(s)} = \hat{v}_\eta(t, z_t, c) \Longrightarrow \hat{x}_t^{(s)} = \alpha_t z_t - \sigma_t \hat{v}_t^{(s)},$$

where the super-script(s) indicates these variables are for the student model. The student model is trained to predict the teacher's noisy latent $z_{t''}$ from $z_t$ with just one denoising step.

This translates to the following distillation loss objective calculated in the x-space:

$$\mathcal{L}_{vani\_dst1} = \varpi(\lambda_t) \|\hat{x}_t^{(s)} - \frac{z_{t''} - \frac{\sigma_{t''}}{\sigma_t} z_t}{\alpha_{t''} \frac{\sigma_{t''}}{\sigma_t} \alpha_t}\|_2^2$$

where $$\varpi(\lambda_t) = \max\left(\frac{\alpha_t^2}{\alpha_t^2}, 1\right)$$

is the truncated SNR weighting coefficients. Advantageously, the inference speed is greatly improved.

In some examples, the teacher model 802 is generated via step distillation. The interaction client 104 retrieves an original machine learning model, such as a model that requires 32 iterative denoising steps. The interaction client 104 generates a smaller version of the original machine learning model, such as a smaller model that requires 16 iterative denoising steps. The interaction client 104 performs step distillation on the original machine learning model and the smaller machine learning model to generate the teacher model 802.

In some examples, the student model 804 is generated via step distillation. The interaction client 104 retrieves a modified machine learning model, such as a model that requires 32 iterative denoising steps. The modified machine learning model is a modification of the original machine learning model, such as the original machine learning model with an improved decoder architecture or UNet architecture. The interaction client 104 generates a smaller version of the modified machine learning model, such as a smaller model that requires 16 iterative denoising steps. The interaction client 104 performs step distillation on the modified machine learning model and the smaller machine learning model to generate the student model 804.

Now that the interaction client 104 generated both the teacher model 802 and the student model 804, the interaction client 104 performs step distillation to generate a new student model that requires 8 iterative denoising steps. For example, once the student model 804 is updated to require 8 steps, the teacher model 802 performs 2 DDIM steps and the student model 804 performs DDIM steps. The output of the teacher model 802 is used to compare with the output of the student model 804. Based on the difference between the two, the student model 804 is updated. Through this training process, the student model 804 is reduced to 8 steps while being trained using the output of the teacher model 802.

In some cases, the interaction client 104 identifies a prompt of a user, the prompt indicative of an intent of the user for generative images and accesses noise data. The interaction client 104 then analyzes a collection of data corresponding to the prompt and the noise data using a first machine learning model to generate first features, the first machine learning model trained to perform a first number of denoising processes. The first machine learning model is also referred to herein as the teacher model.

The interaction client 104 analyzes the collection of data corresponding to the prompt and the noise data using a second machine learning model to generate first features, the second machine learning model trained to perform a second number of denoising processes. The second machine learning model is also referred to herein as the student model.

In some cases, the first number of denoising processes is greater than the second number of denoising processes. For example, the first machine learning model has 32 denoising iterations whereas the second machine learning model has 16 denoising iterations.

The second machine learning model is modified to have a certain number of lesser denoising iterations than the first machine learning model. The interaction client 104 modifies the second machine learning model to include a certain fraction or number less than the first machine learning model, such as half the number or 5 iterations less. In some cases, the interaction client 104 increases the number of iteration steps for the first machine learning model in conjunction with or instead of decreasing the number for the first machine learning model. As such, the second machine learning model is a modified version of the first machine learning model.

In some cases, the first machine learning machine analyzes the data through a larger number of DDIM steps than the second machine learning model. For example, the first machine learning model processes the data in two DDIM steps, from time 0 to 500 for the first step, and 500 to 1000 for the second step, whereas the second machine learning model processes the data in 1 DDIM step, from 0 to 1000.

In some cases, the first machine learning model has already been trained and the processes described herein retrains the already trained first machine learning model by generating the second machine learning model and using the output of the first machine learning model as training data for the second machine learning model.

In some cases, the interaction client reduces the number of iterations by a certain fraction or number, such as half, of the second machine learning model, compares the outputs, and decides whether to add or reduce the number of iterations thereof. For example, a 32 iteration first machine learning model can be compared with a 16 iteration second machine learning model. If the performance of the 16 iteration second machine learning model meets a certain threshold, the interaction client 104 continues reducing the number of iterations to an 8 iteration second machine learning model. On the other hand, if the performance does not meet the threshold, the interaction client 104 adds to the iterations to generate a 24 iteration second machine learning model. Advantageously, the optical student model is found using log(n) number or modifications.

In some cases, the interaction client 104 analyzes the first features using a decoder to generate a first image corresponding to the first features and analyzes the second features using the decoder to generate a second image corresponding to the second features. The interaction client 104 determines how to update the second machine learning model based on the generated first image and second image (as further described herein).

In some cases, the modifying of the second machine learning model and comparison with the first machine learning model output is continuously performed until a particular performance metric is met. In some cases, through each modification and comparison, the first machine learning model stays the same. In other cases, the interaction client 104 also modifies the first machine learning model, such as by increasing or decreasing the number of iterations. The interaction client 104 can modify the first machine learning model to have the same number of iterations as the second machine learning model prior to the last made modification.

Creating a Restructured Latent Diffusion Model

The interaction system identifies a performance characteristic for cross-attention blocks and ResNet blocks in an iterative denoising process of a machine learning model. Cross attention measures the correlation between image features and text features. Cross attention blocks are a type of attention mechanism that enables the model to focus on relevant parts of the text and image simultaneously. These blocks allow for the bidirectional interaction between the text and image modalities, facilitating the alignment of textual details with corresponding visual elements. By attending to both the text and image representations, cross attention blocks enhance the model's ability to generate images that closely match the provided textual descriptions.

ResNet blocks, short for Residual Network blocks, are a fundamental building block of deep neural networks used in stable diffusion models. ResNet blocks help address the issue of vanishing gradients and allow for the training of deeper neural networks. ResNet blocks employ skip connections to propagate the gradients and information from earlier layers directly to subsequent layers. This facilitates the flow of gradients during training, enabling the model to better capture and retain important information while mitigating the vanishing gradient problem. ResNet blocks play a crucial role in stable diffusion models by promoting more effective and stable training, leading to improved image generation quality.

The interaction client 104 assesses a distribution of parameters and computations of UNet, such as in each downsampling stage, middle layer stage, and upsampling stage by processing the UNet with noise and prompts. The interaction client 104 identifies performance characteristics for individual ResNet blocks and/or cross-attention blocks.

The interaction client 104 identifies the ResNet and/or cross-attention blocks that are causing the largest performance characteristics (such as latency, computational resources, and/or the like). In some cases, the interaction client 104 identifies that a downsampling stage requires more computations given the large number of channel dimensions whereas the input and output layers have the largest latency due to feature sizes.

Figure 9:
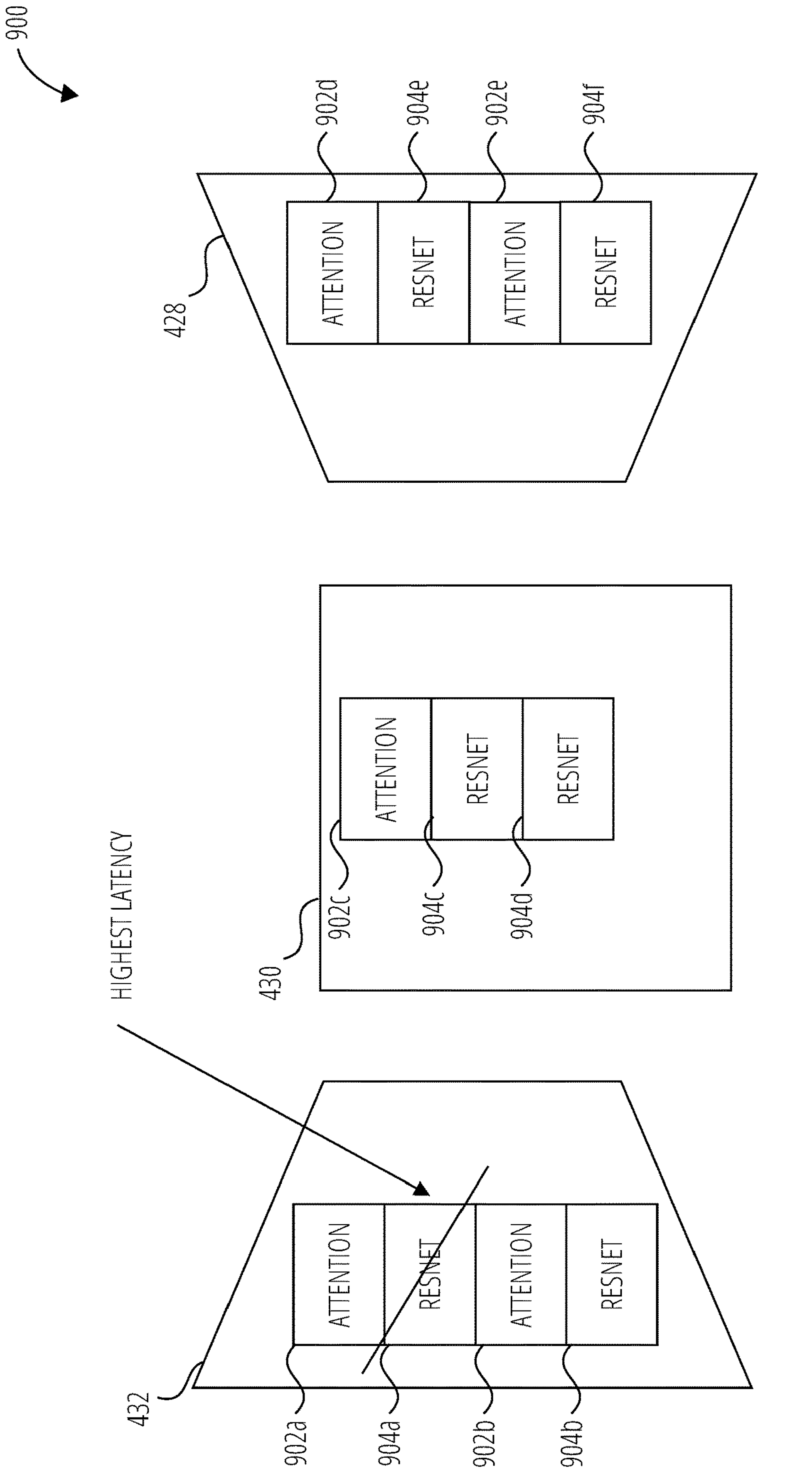
FIG. 9 illustrates an architecture for UNet and the removal of a cross attention block.

FIG. 9 illustrates an architecture 900 for UNet and the removal of a cross attention block. The architecture includes the downsampler 432, the middle layer 430, and the upsampler of FIG. 4, each of which include one or more cross attention blocks 902*a*, 902*b*, 902*c*, 902*d*, and 902*e* (collectively referred to herein as cross attention blocks 902) and/or one or more ResNet blocks 904*a*, 904*b*, 904*c*, 904*d*, 904*e*, and 904*f* (collectively referred to herein as ResNet blocks 904).

The interaction system connects a prior block with a subsequent block of a cross-attention block or ResNet block within the machine learning model based on the identified performance characteristic. In FIG. 9, the first ResNet block 904*a* in the downsampler 432 is identified as causing the largest delay and is removed.

In some cases, the interaction system first disconnects the prior machine learning model block with a current machine learning model block and disconnects the current machine learning model block with the subsequent machine learning model block. Then, the interaction generates the connection between the prior block and the subsequent block to skip over the current block.

In some cases, the interaction system deletes the current machine learning model block after the current machine learning model block is disconnected from the prior machine learning model block and the subsequent machine learning model block.

Although features described herein describe connecting a prior block with a subsequent block, it is appreciated that the features also apply to other ways of avoiding the use of a certain block. For example, the interaction system can change the current block to be a passthrough block, where the input is simply passed through the output. In some cases, the activations of the block can be zeroed out, preventing the block to contribute during inference or training.

In some cases, the interaction system can create conditional execution with conditional logic or with gating mechanisms to determine whether a block should be executed and/or to control the flow of information through blocks.

In some cases, the performance characteristic includes a latency characteristic indicative of a time delay for the corresponding machine learning model block to process an input to generate an output. Latency refers to the time delay or the amount of time it takes for a specific operation or computation to be completed by the machine learning model block.

In some cases, the interaction system identifies the current machine learning model block based on the latency characteristic. The current machine learning model block is subsequent to the prior machine learning model block and the current machine learning model block is prior to the subsequent machine learning model block.

The interaction system identifies the machine learning model block that is causing the most amount of delay and skips over the block by deleting its current connections and connecting a prior and subsequent block directly.

In some cases, the performance characteristic includes a certain performance characteristic pertaining to the performance of the machine learning model. For example, the performance characteristic can include computational complexity, such as certain blocks with higher computational requirements or a greater number of inputs to process or outputs to generate.

The performance characteristic can include memory usage, where if memory is limited, blocks that consume or use (to store) a large amount of memory can be skipped or optimized to reduce memory usage. The performance characteristic can include energy efficiency to skip over blocks that consume excessive power to help optimize energy usage.

The performance characteristic can include model size, where a machine learning model with many parameters may have blocks that contribute less to overall performance. Pruning or skipping such blocks can reduce model size and inference time.

The performance characteristic can include accuracy impact, by identifying blocks that have a relatively low impact on model performance to be candidates for skipping, especially if it leads to significant performance gains in terms of latency or resource usage.

The performance characteristic can include redundancy by identifying multiple blocks that perform similar functions or learn similar features, the model can skip some of them without sacrificing model performance. The performance characteristic can include training time where during training, some blocks may not contribute significantly to model convergence. Identifying and potentially skipping these blocks can speed up the training process.

The performance characteristic can include feature importance for models that incorporate feature selection or extraction, where blocks responsible for less important features can be considered for skipping. The performance characteristic can include task-specific criteria, for example, in natural language processing tasks, the machine learning model may skip blocks responsible for processing less relevant linguistic features.

In some cases, the interaction system identifies blocks to skip over based on one or more performance characteristics, such as one or more of the performance characteristics described above.

Although the examples described herein explain features for performance characteristics for skipping over blocks, it is appreciated that same or different performance characteristics can also be applied for other architectural changes, such as adding blocks back into the machine learning model.

The interaction system identifies a prompt of a user, the prompt indicative of an intent of the user for generative images. The interaction system analyzes data corresponding to the prompt using the machine learning model to generate one or more images, the machine learning model trained to generate images based on data corresponding to prompts.

In some cases, after a particular block is removed, the interaction client 104 reruns the stable diffusion machine learning model and generates images. The interaction client 104 assesses the correspondence between features of the prompt and features of the image to determine how the removal or addition of the ResNet or cross-attention blocks affected performance of the stable diffusion model. The interaction client 104 makes such a determination by comparing performance characteristics of the stable diffusion model before and after the removal or addition of the ResNet or cross-attention blocks.

In some cases, the interaction system skips over multiple blocks based on one or more performance characteristics. For example, the interaction system connects the prior machine learning model block with the subsequent machine learning model block of the machine learning model blocks and connects another prior machine learning model block with another subsequent machine learning model block for another node in response to identifying the performance characteristic for individual machine learning model blocks.

Figure 10:
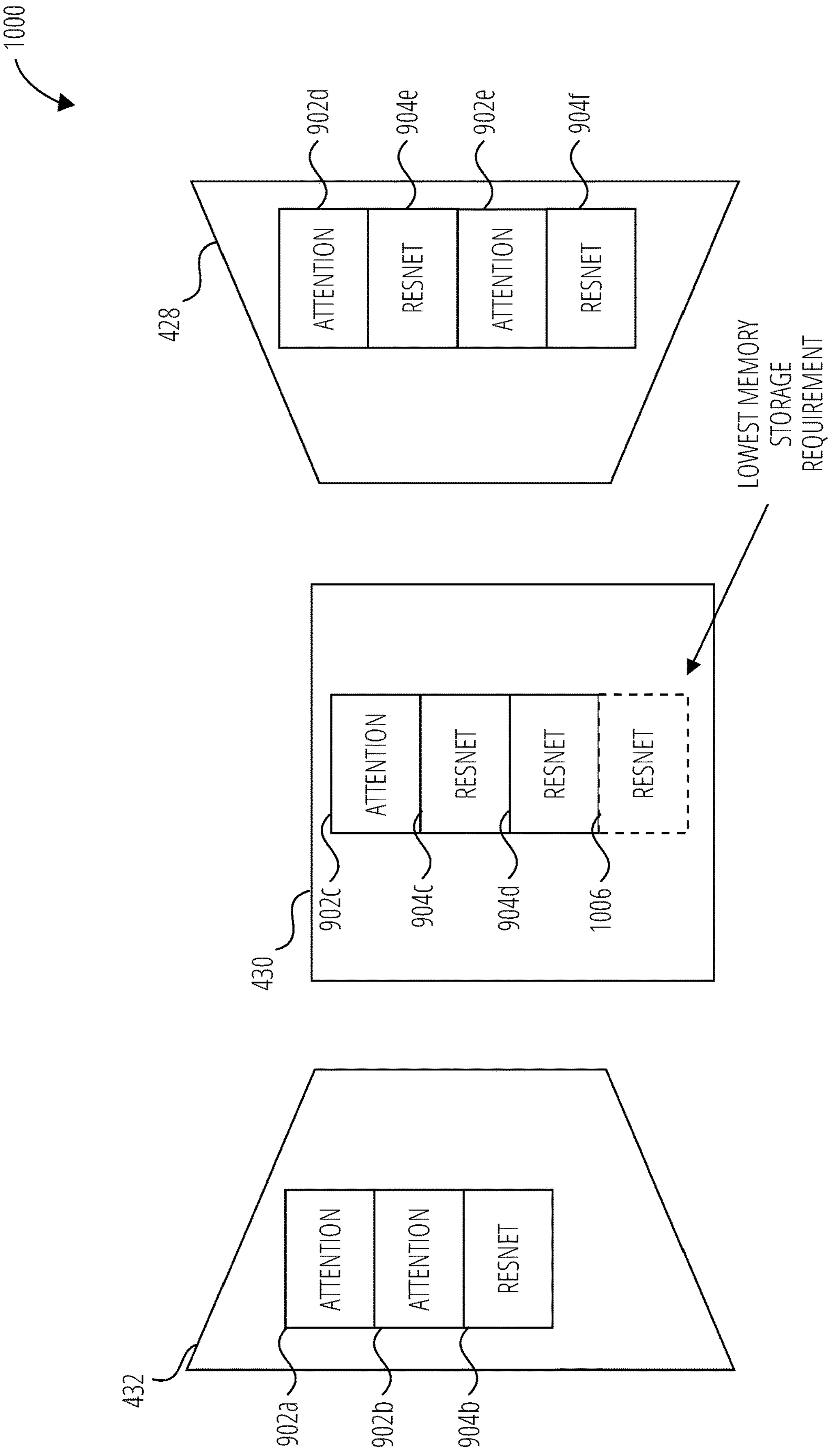
FIG. 10 illustrates the addition of a machine learning block to a machine learning model, according to some examples.

FIG. 10 illustrates the addition of a machine learning model block to a machine learning model 1000, according to some examples. In some cases, a machine learning model block, such as ResNet 1006, is added back to the machine learning model. As shown in FIG. 10, the ResNet 1006 is added back to the model subsequent to the ResNet block 904*a* being removed from the machine learning model.

In some cases, the machine learning model blocks are added and/or skipped over. In some cases, the blocks are added then the blocks are skipped over, and/or vice versa. The machine learning model is continuously optimized until both one or more performance characteristics for adding the blocks and one or more performance characteristics for skipping the blocks are met. For example, skipping over a first block may have reduced latency but may have decreased performance of the model. A new block is added which increases performance but increases latency over the desired latency performance threshold. The next largest latency block is removed and a second new block added, which then meet both the desired performance and latency thresholds.

To add a new block, the interaction system disconnects the connection between two blocks, a prior and subsequent block, and connects the prior block with the new block and the new block with the subsequent block.

In some cases, the new machine learning model block is a copy of an existing machine learning model block of the machine learning model. For example, the interaction system can identify an existing machine learning model block to copy based on one or more performance characteristic of the existing machine learning model blocks. In some cases, the performance characteristic assessed to determine whether and/or how to skip the machine learning block can be the same or different than the performance characteristic assessed to determine whether and/or how to add the new machine learning model block.

In some cases, the interaction system adds the new machine learning model block at different locations in the machine learning model and assesses the performance of the machine learning model with the new machine learning model block at each of the different locations. The interaction system then adds the new machine learning model block at a particular location permanently based on the assessed performance. For example, the interaction system finally places the new machine learning model block in a location that results in the highest machine learning model accuracy performance.

For example, a current machine learning model block (e.g., a cross-attention block) can be identified by identifying the machine learning model block that causes the biggest latency, whereas the new machine learning model block (e.g., a ResNet block) is copied from an existing machine learning model block that causes the smallest latency or requires the smallest memory storage.

Data Communications Architecture

Figure 11:
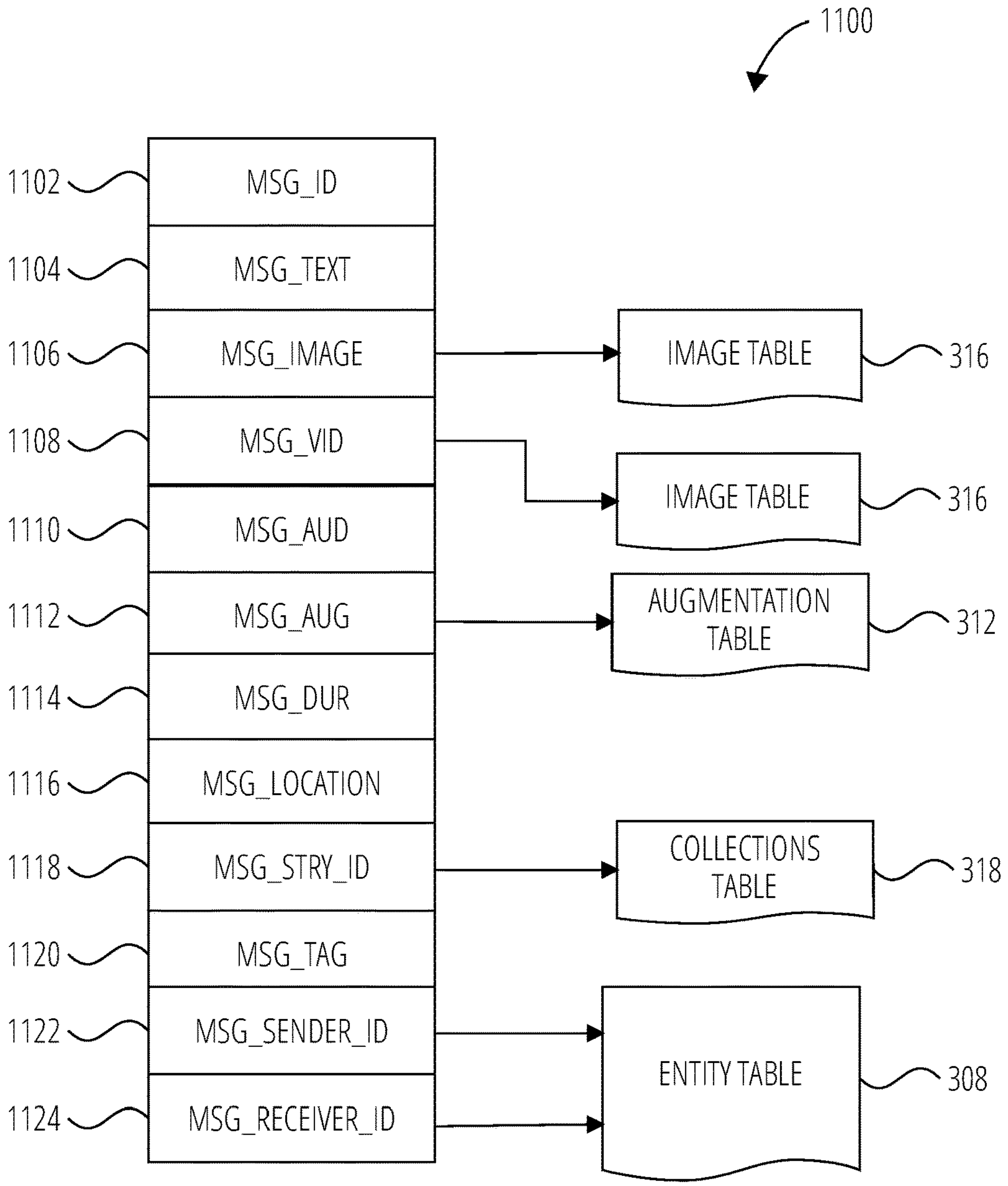
FIG. 11 is a diagrammatic representation of a message, according to some examples.

FIG. 11 is a schematic diagram illustrating a structure of a message 1100, according to some examples, generated by an interaction client 104 for communication to a further interaction client 104 via the interaction servers 124. The content of a particular message 1100 is used to populate the message table 306 stored within the database 304, accessible by the interaction servers 124. Similarly, the content of a message 1100 is stored in memory as "in-transit" or "in-flight" data of the user system 102 or the interaction servers 124. A message 1100 is shown to include the following example components:

- Message identifier 1102: a unique identifier that identifies the message 1100.
- Message text payload 1104: text, to be generated by a user via a user interface of the user system 102, and that is included in the message 1100.
- Message image payload 1106: image data, captured by a camera component of a user system 102 or retrieved from a memory component of a user system 102, and that is included in the message 1100. Image data for a sent or received message 1100 may be stored in the image table 316.
- Message video payload 1108: video data, captured by a camera component or retrieved from a memory component of the user system 102, and that is included in the message 1100. Video data for a sent or received message 1100 may be stored in the image table 316.
- Message audio payload 1110: audio data, captured by a microphone or retrieved from a memory component of the user system 102, and that is included in the message 1100.
- Message augmentation data 1112: augmentation data (e.g., filters, stickers, or other annotations or enhancements) that represents augmentations to be applied to message image payload 1106, message video payload 1108, or message audio payload 1110 of the message 1100. Augmentation data for a sent or received message 1100 may be stored in the augmentation table 312.
- Message duration parameter 1114: parameter value indicating, in seconds, the amount of time for which content of the message (e.g., the message image payload 1106, message video payload 1108, message audio payload 1110) is to be presented or made accessible to a user via the interaction client 104.
- Message geolocation parameter 1116: geolocation data (e.g., latitudinal and longitudinal coordinates) associated with the content payload of the message. Multiple message geolocation parameter 1116 values may be included in the payload, each of these parameter values being associated with respect to content items included in the content (e.g., a specific image within the message image payload 1106, or a specific video in the message video payload 1108).
- Message story identifier 1118: identifier values identifying one or more content collections (e.g., "stories" identified in the collections table 318) with which a particular content item in the message image payload 1106 of the message 1100 is associated. For example, multiple images within the message image payload 1106 may each be associated with multiple content collections using identifier values.
- Message tag 1120: each message 1100 may be tagged with multiple tags, each of which is indicative of the subject matter of content included in the message payload. For example, where a particular image included in the message image payload 1106 depicts an animal (e.g., a lion), a tag value may be included within the message tag 1120 that is indicative of the relevant animal. Tag values may be generated manually, based on user input, or may be automatically generated using, for example, image recognition.
- Message sender identifier 1122: an identifier (e.g., a messaging system identifier, email address, or device identifier) indicative of a user of the user system 102 on which the message 1100 was generated and from which the message 1100 was sent.

Message receiver identifier 1124: an identifier (e.g., a messaging system identifier, email address, or device identifier) indicative of a user of the user system 102 to which the message 1100 is addressed.

The contents (e.g., values) of the various components of message 1100 may be pointers to locations in tables within which content data values are stored. For example, an image value in the message image payload 1106 may be a pointer to (or address of) a location within an image table 316. Similarly, values within the message video payload 1108 may point to data stored within an image or video table 316, values stored within the message augmentation data 1112 may point to data stored in an augmentation table 312, values stored within the message story identifier 1118 may point to data stored in a collections table 318, and values stored within the message sender identifier 1122 and the message receiver identifier 1124 may point to user records stored within an entity table 308.

System with Head-Wearable Apparatus

Figure 12:
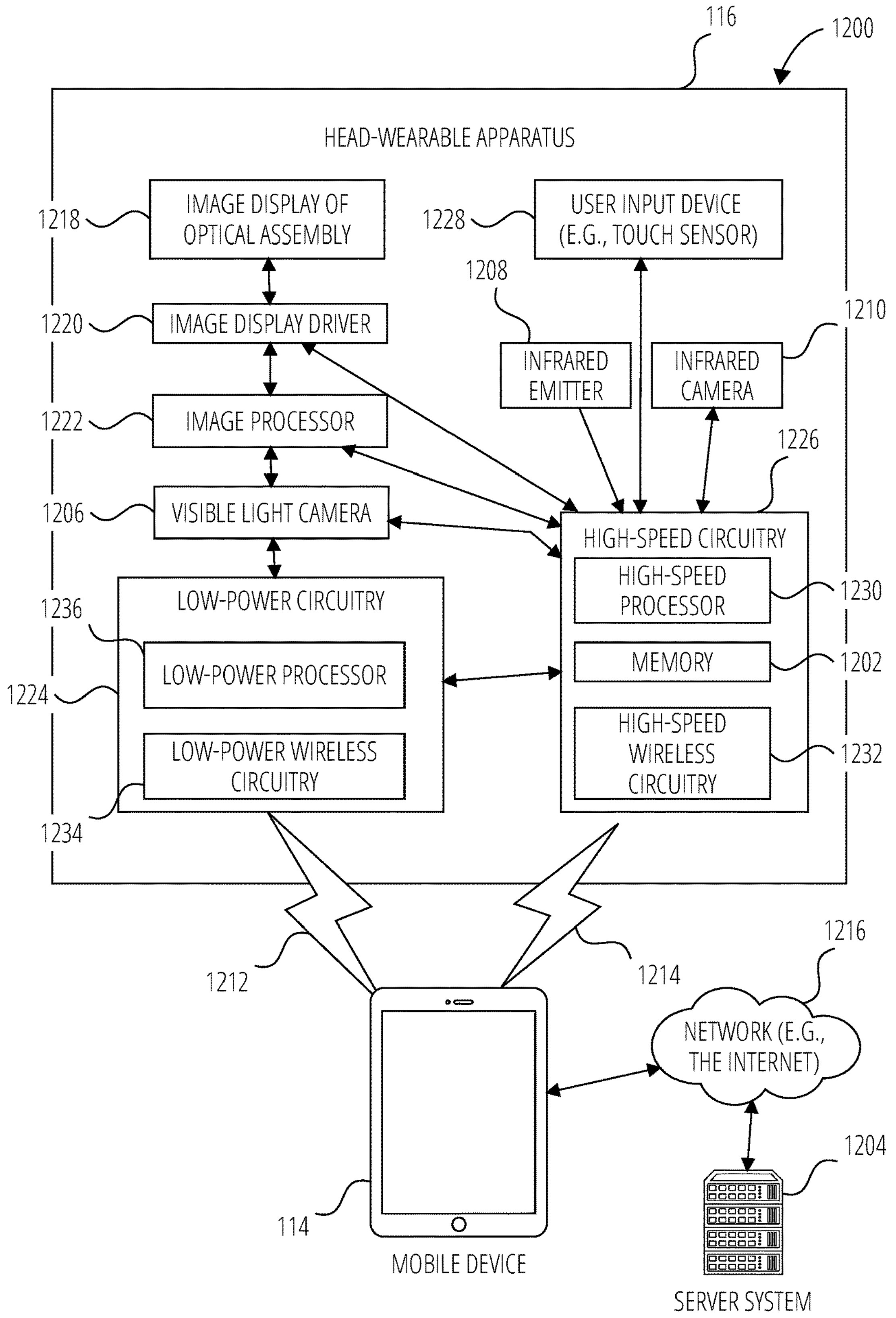
FIG. 12 illustrates a system including a head-wearable apparatus with a selector input device, according to some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 108. The networks 108 may include any combination of wired and wireless connections.

The head-wearable apparatus 116 includes one or more cameras, each of which may be, for example, a visible light camera 1206, an infrared emitter 1208, and an infrared camera 1210.

An interaction client, such as a mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WI-FI®. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Machine Architecture

Figure 13:
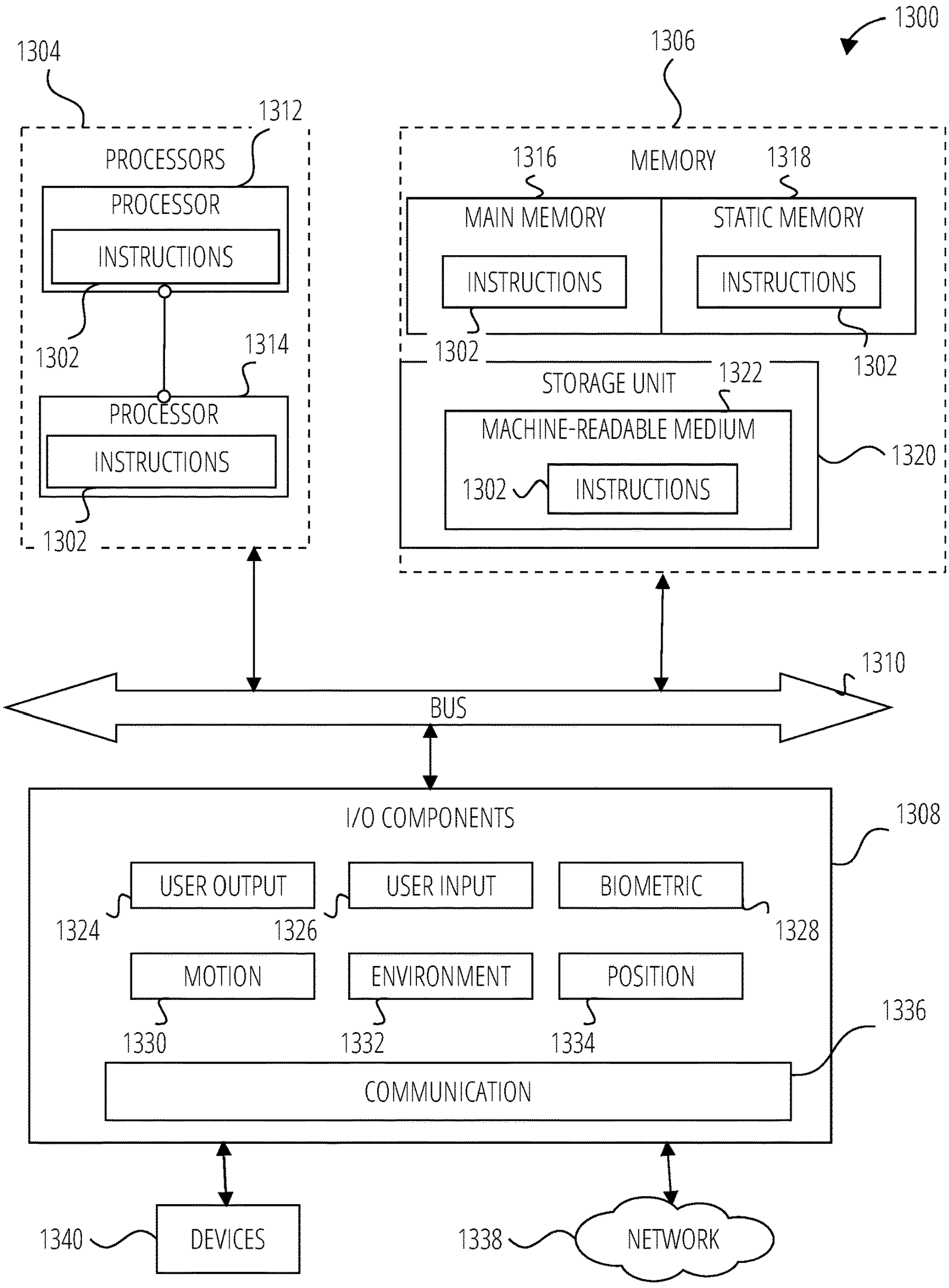
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of the machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1330 include acceleration sensor components (e.g., accelerometer), gravitation sensor components, rotation sensor components (e.g., gyroscope).

The environmental components 1332 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

Figure 14:
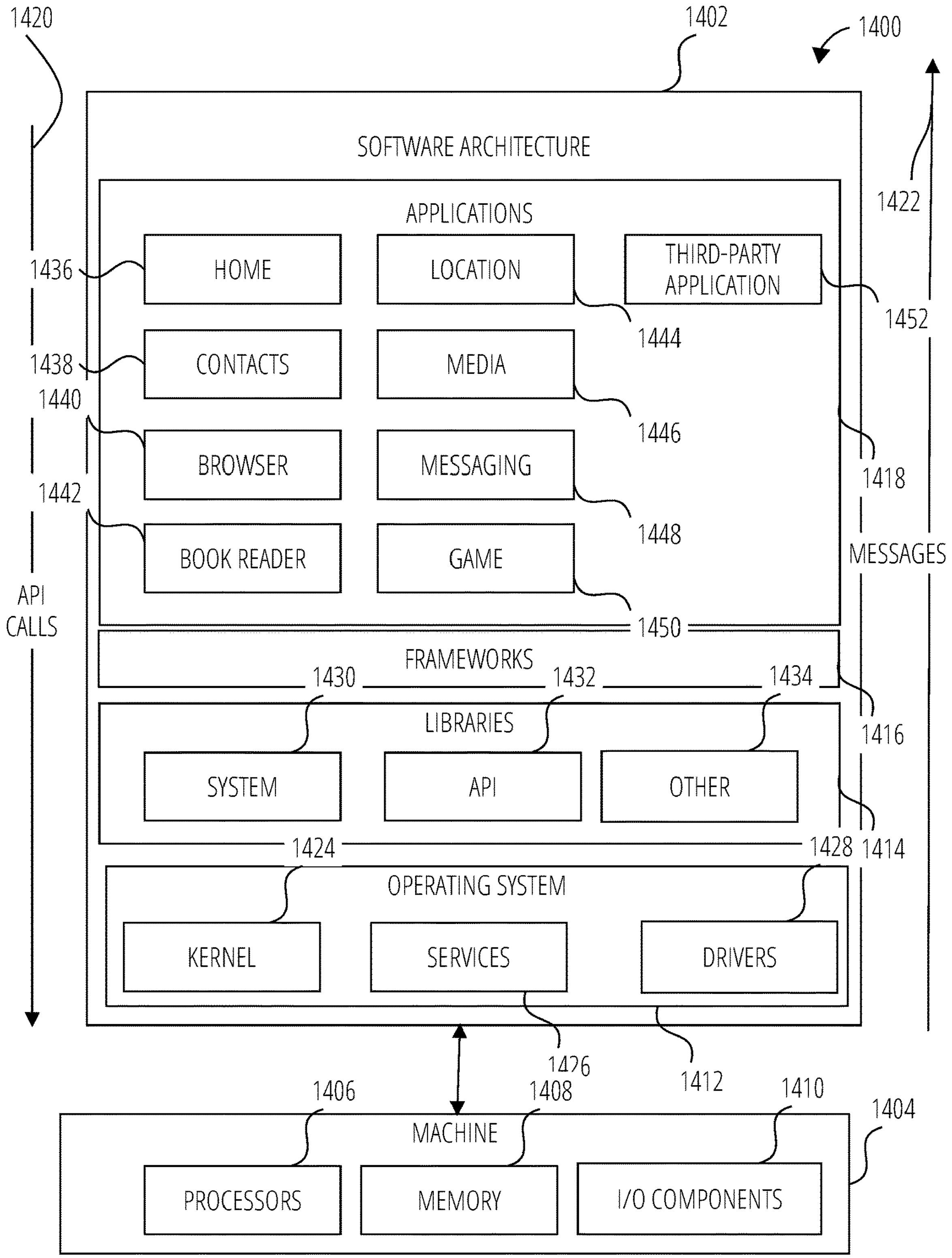
FIG. 14 is a block diagram showing a software architecture within which examples may be implemented.

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

Machine-Learning Pipeline

Figure 16:
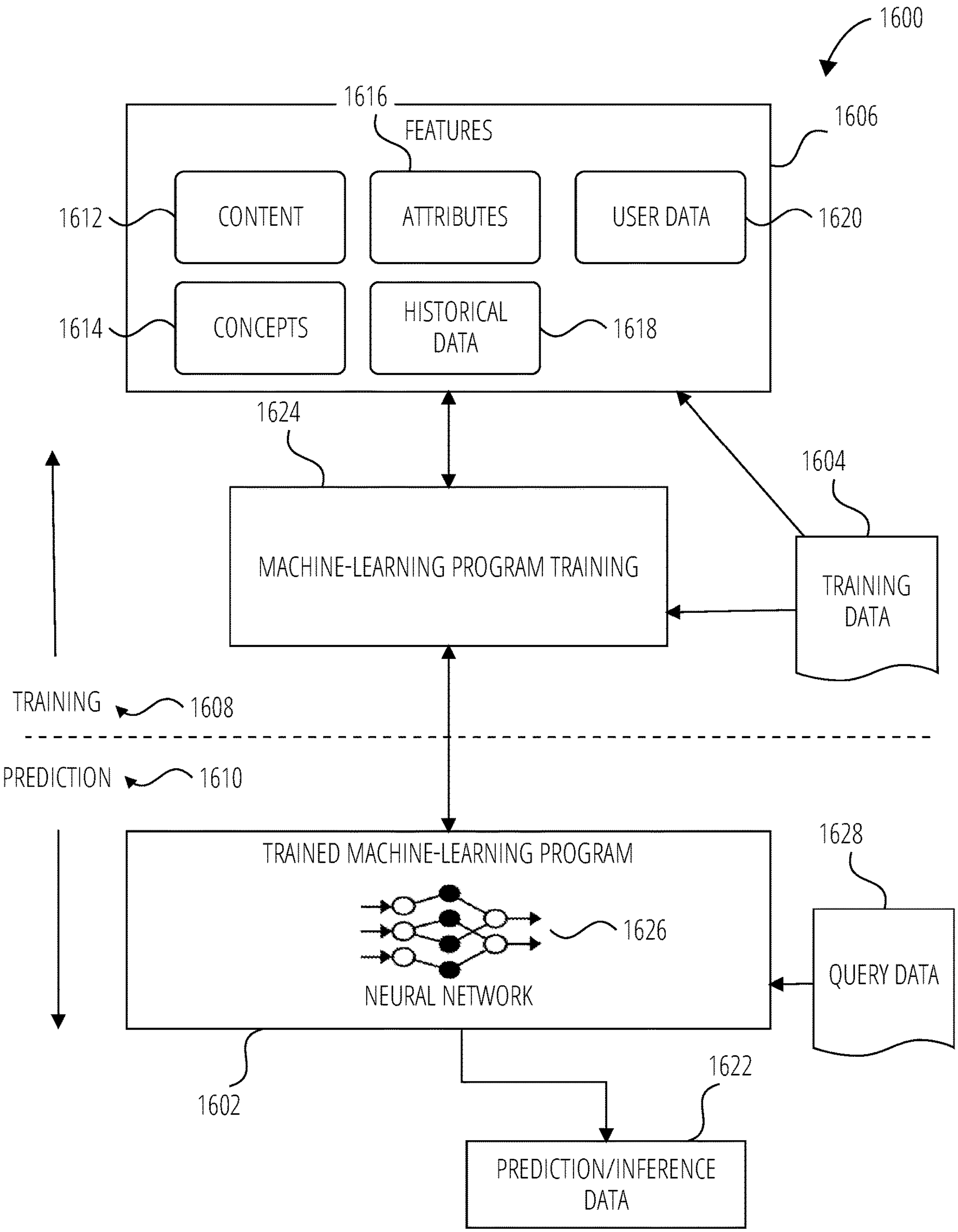
FIG. 16 illustrates training and use of a machine-learning program, according to some examples.

FIG. 16 is a flowchart depicting a machine-learning pipeline 1600, according to some examples. The machine-learning pipelines 1600 may be used to generate a trained model, for example the trained machine-learning program 1602 of FIG. 16, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

- Supervised learning involves training a model using labeled data to predict an output for new; unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 15:
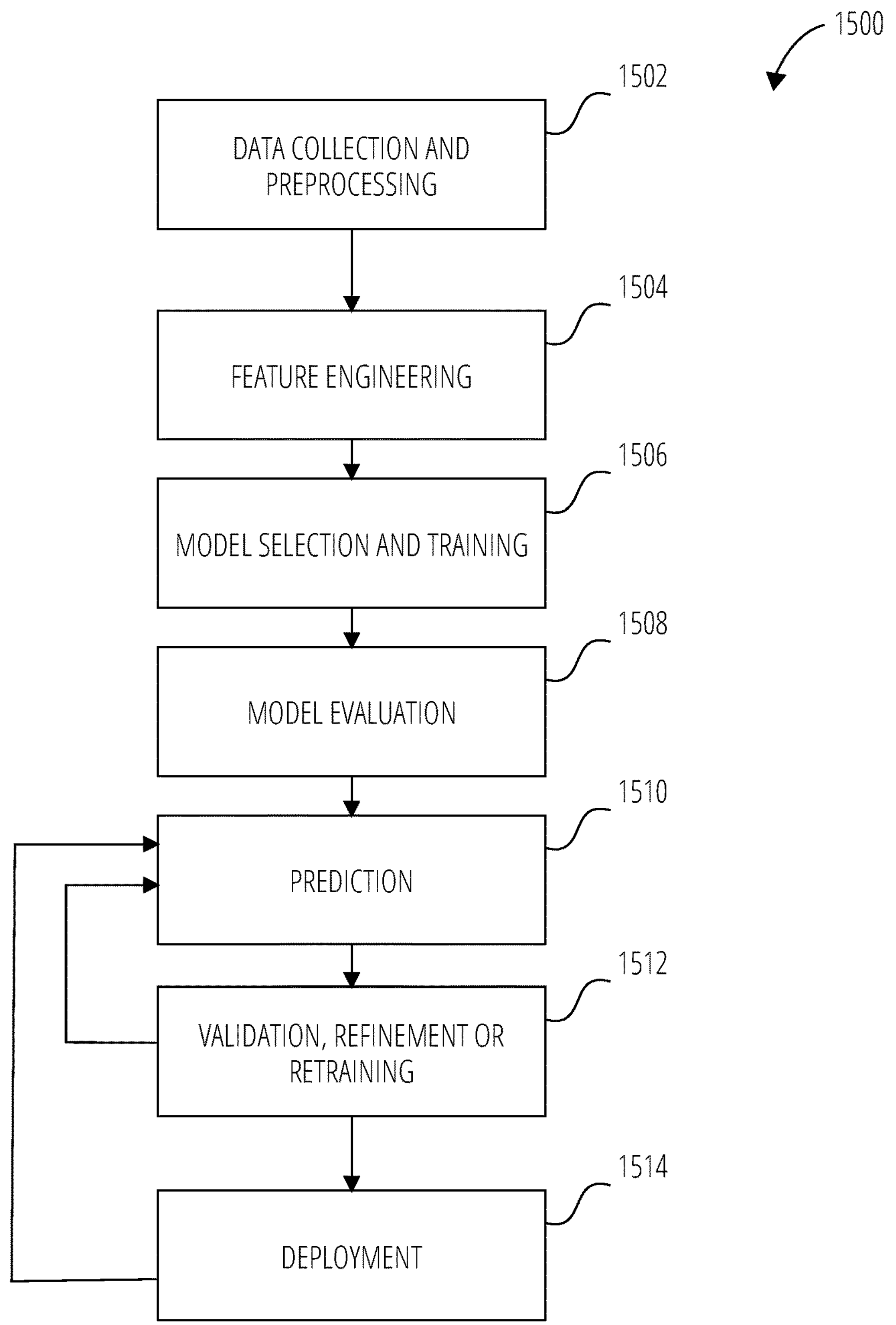
FIG. 15 illustrates a machine-learning pipeline, according to some examples.

Generating a trained machine-learning program 1602 may include multiple types of phases that form part of the machine-learning pipeline 1600, including for example the following phases 1500 illustrated in FIG. 15:

- Data collection and preprocessing 1502: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.
- Feature engineering 1504: This may include selecting and transforming the training data 1604 to create features that are useful for predicting the target variable. Feature engineering may include (1) receiving features 1606 (e.g., as structured or labeled data in supervised learning) and/or (2) identifying features 1606 (e.g., unstructured or unlabeled data for unsupervised learning) in training data 1604.
- Model selection and training 1506: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.
- Model evaluation 1508: This may include evaluating the performance of a trained model (e.g., the trained machine-learning program 1602) on a separate testing dataset. This can help determine if the model is overfitting or underfitting and if it is suitable for deployment.
- Prediction 1510: This involves using a trained model (e.g., trained machine-learning program 1602) to generate predictions on new, unseen data.
- Validation, refinement or retraining 1512: This may include updating a model based on feedback generated from the prediction phase, such as new data or user feedback.
- Deployment 1514: This may include integrating the trained model (e.g., the trained machine-learning program 1602) into a larger system or application, such as a web service, mobile app, or IoT device. This can involve setting up APIs, building a user interface, and ensuring that the model is scalable and can handle large volumes of data.

FIG. 16 illustrates two example phases, namely a training phase 1608 (part of the model selection and trainings 1506) and a prediction phase 1610 (part of prediction 1510). Prior to the training phase 1608, feature engineering 1504 is used to identify features 1606. This may include identifying informative, discriminating, and independent features for the effective operation of the trained machine-learning program 1602 in pattern recognition, classification, and regression. In some examples, the training data 1604 includes labeled data, which is known data for pre-identified features 1606 and one or more outcomes.

Each of the features 1606 may be a variable or attribute, such as individual measurable property of a process, article, system, or phenomenon represented by a data set (e.g., the training data 1604). Features 1606 may also be of different types, such as numeric features, strings, vectors, matrices, encodings, and graphs, and may include one or more of content 1612, concepts 1614, attributes 1616, historical data 1618 and/or user data 1620, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1608, the machine-learning pipeline 1600 uses the training data 1604 to find correlations among the features 1606 that affect a predicted outcome or prediction/inference data 1622.

With the training data 1604 and the identified features 1606, the trained machine-learning program 1602 is trained during the training phase 1608 during machine-learning program training 1624. The machine-learning program training 1624 appraises values of the features 1606 as they correlate to the training data 1604. The result of the training is the trained machine-learning program 1602 (e.g., a trained or learned model).

Further, the training phase 1608 may involve machine learning, in which the training data 1604 is structured (e.g., labeled during preprocessing operations), and the trained machine-learning program 1602 implements a relatively simple neural network 1626 capable of performing, for example, classification and clustering operations. In other examples, the training phase 1608 may involve deep learning, in which the training data 1604 is unstructured, and the trained machine-learning program 1602 implements a deep neural network 1626 that is able to perform both feature extraction and classification/clustering operations.

A neural network 1626 may, in some examples, be generated during the training phase 1608, and implemented within the trained machine-learning program 1602. The neural network 1626 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1626 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1626 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1608, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1626 is iteratively trained by adjusting model parameters to minimize a specific loss function or maximize a certain objective. The system can continue to train the neural network 1626 by adjusting parameters based on the output of the validation, refinement, or retraining block 1512, and rerun the prediction 1510 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1626 even after deployment 1514 of the neural network 1626. The neural network 1626 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1610, the trained machine-learning program 1602 uses the features 1606 for analyzing query data 1628 to generate inferences, outcomes, or predictions, as examples of a prediction/inference data 1622. For example, during prediction phase 1610, the trained machine-learning program 1602 is used to generate an output. Query data 1628 is provided as an input to the trained machine-learning program 1602, and the trained machine-learning program 1602 generates the prediction/inference data 1622 as output, responsive to receipt of the query data 1628. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 1602 may be a generative AI model. Generative AI is a term that may refer to any type of artificial intelligence that can create new content from training data 1604. For example, generative AI can produce text, images, video, audio, code or synthetic data that are similar to the original data but not identical.

Some of the techniques that may be used in generative AI are:

- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.
- Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.
- Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1622 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: accessing a first latent diffusion machine learning model, the first latent diffusion machine learning model trained to perform a first number of denoising steps; accessing a second latent diffusion machine learning model that was derived from the first latent diffusion machine learning model, the second latent diffusion machine learning model trained to perform a second number of denoising steps; generating noise data; processing the noise data via the first latent diffusion machine learning model to generate one or more first latent features; processing the noise data via the second latent diffusion machine learning model to generate one or more second latent features; inputting the one or more first latent features and the one or more second latent features into a loss function; and modifying a parameter of the second latent diffusion machine learning model based on an output of the loss function.

In Example 2, the subject matter of Example 1 includes, wherein the loss function comprises a distillation loss and an original loss.

In Example 3, the subject matter of Example 2 includes, wherein the distillation loss comprises: wherein is a truncated SNR weighting coefficients.

In Example 4, the subject matter of Examples 2-3 includes, wherein the original loss comprises: wherein v is a ground-truth target velocity.

In Example 5, the subject matter of Examples 2-4 includes, wherein the loss function includes a random probability distribution, and wherein the loss function applies a first type of distillation loss or a second type of distillation loss based on the random probability distribution.

In Example 6, the subject matter of Example 5 includes, wherein the first type of distillation loss applies a classifier-free guidance function to determine the distillation loss, wherein the first type is different than the second type.

In Example 7, the subject matter of Example 6 includes, wherein the second type of distillation loss does not apply a classifier-free guidance function to determine the distillation loss.

In Example 8, the subject matter of Examples 1-7 includes, wherein modifying the parameter includes performing back propagation on the second latent diffusion machine learning model based on the output of the loss function that processes the one or more first latent features of the first latent diffusion machine learning model and the one or more second latent features of the second latent diffusion machine learning model.

In Example 9, the subject matter of Examples 1-8 includes, wherein the operations further comprise: restructuring the first latent diffusion machine learning model to perform a third number of denoising steps, the first number of denoising steps being larger than the third number of denoising steps; and restructuring the second latent diffusion machine learning model to perform a fourth number of denoising steps, the second number of denoising steps being larger than the fourth number of denoising steps, wherein processing the noise data via the first latent diffusion machine learning model comprises processing the noise data via the restructured first latent diffusion machine learning model, and wherein processing the noise data via the second latent diffusion machine learning model comprises processing the noise data via the restructured second latent diffusion machine learning model.

In Example 10, the subject matter of Example 9 includes, wherein the third number of denoising steps is half the first number of denoising steps.

In Example 11, the subject matter of Examples 9-10 includes, wherein the second number of denoising steps is half the fourth number of denoising steps.

In Example 12, the subject matter of Examples 9-11 includes, wherein the fourth number of denoising steps is half the third number of denoising steps.

In Example 13, the subject matter of Examples 1-12 includes, wherein the first and second latent diffusion machine learning models are stable diffusion models including cross-attention blocks and ResNet blocks.

In Example 14, the subject matter of Examples 1-13 includes, wherein the second latent diffusion machine learning model is derived from the first latent diffusion machine learning model by restructuring a UNet architecture of the first latent diffusion machine learning model.

In Example 15, the subject matter of Example 14 includes, wherein restructuring of the UNet architecture includes changing the architecture of cross attention and ResNet blocks.

In Example 16, the subject matter of Examples 1-15 includes, wherein the first latent diffusion machine learning model includes a denoising architecture, wherein the number of denoising steps include a number of iterations for transmitting the output of a prior iteration as input to a current iteration of the denoising architecture, and wherein processing the noise data via the first latent diffusion machine learning model to generate one or more first latent features includes iteratively processing the noise data via the denoising architecture for the first number of denoising steps to generate first latent features.

In Example 17, the subject matter of Examples 1-16 includes, the operations further comprising: receiving a prompt for image generated from a user; and processing the prompt via the second latent diffusion machine learning model with the modified parameter to generate one or more user-requested images.

In Example 18, the subject matter of Example 17 includes, wherein the output of the second latent diffusion machine learning model is processed through a decoder to generate an output image of the current iteration.

Example 19 is a method comprising: accessing, by one or more processors, a first latent diffusion machine learning model, the first latent diffusion machine learning model trained to perform a first number of denoising steps; accessing a second latent diffusion machine learning model that was derived from the first latent diffusion machine learning model, the second latent diffusion machine learning model trained to perform a second number of denoising steps; generating noise data; processing the noise data via the first latent diffusion machine learning model to generate one or more first latent features; processing the noise data via the second latent diffusion machine learning model to generate one or more second latent features; inputting the one or more first latent features and the one or more second latent features into a loss function; and modifying a parameter of the second latent diffusion machine learning model based on an output of the loss function.

Example 20 is a non-transitory computer-readable storage medium, the computer-readable storage medium including instructions that when executed by a computer, cause the computer to perform operations comprising: accessing a first latent diffusion machine learning model, the first latent diffusion machine learning model trained to perform a first number of denoising steps; accessing a second latent diffusion machine learning model that was derived from the first latent diffusion machine learning model, the second latent diffusion machine learning model trained to perform a second number of denoising steps; generating noise data; processing the noise data via the first latent diffusion machine learning model to generate one or more first latent features; processing the noise data via the second latent diffusion machine learning model to generate one or more second latent features; inputting the one or more first latent features and the one or more second latent features into a loss function; and modifying a parameter of the second latent diffusion machine learning model based on an output of the loss function.

Example 21 is at least one machine-readable medium including instructions that, when executed by processing circuitry, cause the processing circuitry to perform operations to implement of Examples 1-20.

Example 22 is an apparatus comprising means to implement of Examples 1-20.

Example 23 is a system to implement of Examples 1-20.

Example 24 is a method to implement of Examples 1-20.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

Conclusion

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:

at least one processor; and at least one memory component storing instructions that, when executed by the at least one processor, cause the at least one processor to perform operations comprising:

accessing a first latent diffusion machine learning model, the first latent diffusion machine learning model trained to perform a first number of denoising steps;

accessing a second latent diffusion machine learning model that was derived from the first latent diffusion machine learning model, the second latent diffusion machine learning model trained to perform a second number of denoising steps;

generating noise data;

processing the noise data via the first latent diffusion machine learning model to generate one or more first latent features;

processing the noise data via the second latent diffusion machine learning model to generate one or more second latent features;

inputting the one or more first latent features and the one or more second latent features into a loss function; and modifying a parameter of the second latent diffusion machine learning model based on an output of the loss function;

wherein the loss function comprises a distillation loss;

wherein the distillation loss comprises:

$$\mathcal{L}_{vani\_dst1} = w(\lambda_t)\left\| \hat{x}_t^{(s)} - \frac{z_{t''} - \frac{\sigma_{t''}}{\sigma_t} z_t}{\sigma_{t''} - \frac{\sigma_{t''}}{\sigma_t} \alpha_t} \right\|_2^2,$$

wherein $$w(\lambda_t) = \max\left(\frac{\alpha_t^2}{\sigma_t^2}, 1\right)$$

is a truncated SNR weighting coefficient, wherein $w(\lambda_t)$ is a truncated signal-to-noise ratio (SNR) weighting coefficient determined as a function of a relative signal-to-noise parameter $\lambda_t$ for a diffusion timestep $$t, x_t^{(s)}$$

represents a predicted denoised latent produced by the student latent diffusion machine learning model at the timestep t, $Z_{t''}$ represents a teacher-model-generated noisy latent at an earlier timestep t'', $\alpha_t$ and $\sigma_t$ are timestep-dependent signal and noise scaling coefficients, respectively, determined by a diffusion noise schedule, $\alpha_{t''}$ and $\sigma_{t''}$ are corresponding signal and noise scaling coefficients associated with the timestep t'', and $$\|\cdot\|_2^2$$

denotes a squared Euclidean norm computed in latent space.

2. The system of claim 1, wherein the loss function further comprises an original loss.

3. The system of claim 2, wherein the original loss comprises:

$$\mathcal{L}_{ori} = \mathbb{E}_{t\sim U[0,1], x\sim p_{data}(x), \epsilon\sim \mathcal{N}(0,1)} \|\hat{v}_\theta(t, z_t, c) - v\|_2^2,$$

wherein v is a ground-truth target velocity, $E_{t\sim U[0,1],\ x\sim p_{data}(x), \varepsilon\sim \mathcal{N}(0,1)}$denotes an expectation over (i) a diffusion timestep tsampled from a uniform distribution, (ii) a clean latent x sampled from a training data distribution, and (iii) random noise ε sampled from a multivariate normal distribution, $_\theta$e (t, $z_t$, c) is a velocity prediction output by the latent diffusion machine learning model parameterized by θ, conditioned on the diffusion timestep t, a noisy latent $z_t$ , and an optional conditioning input c, $z_t$is a noisy latent generated by combining the clean latent xwith the random noise εaccording to a diffusion noise schedule, and $$\|\cdot\|_2^2$$

computed in latent space.

4. The system of claim 2, wherein the loss function includes a random probability distribution, and wherein the loss function applies a first type of distillation loss or a second type of distillation loss based on the random probability distribution.

5. The system of claim 4, wherein the first type of distillation loss applies a classifier-free guidance function to determine the distillation loss, wherein the first type is different than the second type.

6. The system of claim 5, wherein the second type of distillation loss does not apply a classifier-free guidance function to determine the distillation loss.

7. The system of claim 1, wherein modifying the parameter includes performing back propagation on the second latent diffusion machine learning model based on the output of the loss function that processes the one or more first latent features of the first latent diffusion machine learning model and the one or more second latent features of the second latent diffusion machine learning model.

8. The system of claim 1, wherein the operations further comprise:

restructuring the first latent diffusion machine learning model to perform a third number of denoising steps, the first number of denoising steps being larger than the third number of denoising steps; and restructuring the second latent diffusion machine learning model to perform a fourth number of denoising steps, the second number of denoising steps being larger than the fourth number of denoising steps, wherein processing the noise data via the first latent diffusion machine learning model comprises processing the noise data via the restructured first latent diffusion machine learning model, and wherein processing the noise data via the second latent diffusion machine learning model comprises processing the noise data via the restructured second latent diffusion machine learning model.

9. The system of claim 8, wherein the third number of denoising steps is half the first number of denoising steps.

10. The system of claim 8, wherein the fourth number of denoising steps is half the second number of denoising steps.

11. The system of claim 8, wherein the fourth number of denoising steps is half the third number of denoising steps.

12. The system of claim 1, wherein the first and second latent diffusion machine learning models are stable diffusion models including cross-attention blocks and ResNet blocks.

13. The system of claim 1, wherein the second latent diffusion machine learning model is derived from the first latent diffusion machine learning model by restructuring a UNet architecture of the first latent diffusion machine learning model.

14. The system of claim 13, wherein restructuring of the UNet architecture includes changing the architecture of cross attention and ResNet blocks.

15. The system of claim 1, wherein the first latent diffusion machine learning model includes a denoising architecture, wherein the number of denoising steps include a number of iterations for transmitting an output of a prior iteration as input to a current iteration of the denoising architecture, and wherein processing the noise data via the first latent diffusion machine learning model to generate one or more first latent features includes iteratively processing the noise data via the denoising architecture for the first number of denoising steps to generate first latent features.

16. The system of claim 1, the operations further comprising:

receiving a prompt for image generated from a user; and processing the prompt via the second latent diffusion machine learning model with the modified parameter to generate one or more user-requested images.

17. The system of claim 16, wherein the output of the second latent diffusion machine learning model is processed through a decoder to generate an output image of a current iteration.

18. A method comprising:

accessing, by one or more processors, a first latent diffusion machine learning model, the first latent diffusion machine learning model trained to perform a first number of denoising steps;

accessing a second latent diffusion machine learning model that was derived from the first latent diffusion machine learning model, the second latent diffusion machine learning model trained to perform a second number of denoising steps;

generating noise data;

processing the noise data via the first latent diffusion machine learning model to generate one or more first latent features;

processing the noise data via the second latent diffusion machine learning model to generate one or more second latent features;

inputting the one or more first latent features and the one or more second latent features into a loss function; and modifying a parameter of the second latent diffusion machine learning model based on an output of the loss function;

wherein the loss function comprises an original loss, wherein the original loss comprises:

$$\mathcal{L}_{ori} = \mathbb{E}_{t\sim U[0,1], x\sim p_{data}(x), \epsilon\sim \mathcal{N}(0,I)} \|\hat{v}_\theta(t, z_t, c) - v\|_2^2,$$

wherein v is a ground-truth target velocity, $E_{t\sim U[0,1],\ x\sim p_{data}(x), \varepsilon\sim \mathcal{N}(0,1)}$denotes an expectation over (i) a diffusion timestep tsampled from a uniform distribution, (ii) a clean latent x sampled from a training data distribution, and (iii) random noise ε sampled from a multivariate normal distribution, $v_\theta(t, z_t, c)$ is a velocity prediction output by the latent diffusion machine learning model parameterized by θ, conditioned on the diffusion timestep t, a noisy latent $z_t$, and an optional conditioning input c, $z_t$ is a noisy latent generated by combining the clean latent xwith the random noise εaccording to a diffusion noise schedule, and $$\|\cdot\|_2^2$$

denotes a squared Euclidean norm computed in latent space.

19. A non-transitory computer-readable storage medium, the computer-readable storage medium including instructions that when executed by a computer, cause the computer to perform operations comprising:

accessing a first latent diffusion machine learning model, the first latent diffusion machine learning model trained to perform a first number of denoising steps;

accessing a second latent diffusion machine learning model that was derived from the first latent diffusion machine learning model, the second latent diffusion machine learning model trained to perform a second number of denoising steps;

generating noise data;

processing the noise data via the first latent diffusion machine learning model to generate one or more first latent features;

processing the noise data via the second latent diffusion machine learning model to generate one or more second latent features;

inputting the one or more first latent features and the one or more second latent features into a loss function; and modifying a parameter of the second latent diffusion machine learning model based on an output of the loss function;

wherein the loss function comprises a distillation loss and an original loss;

wherein the distillation loss comprises:

$$\mathcal{L}_{vani\_dst1} = w(\lambda_t)\left\|\hat{x}_t^{(s)} - \frac{z_{t''-\frac{\sigma_{t''}}{\sigma_t}} z_t}{\sigma_{t''-\frac{\sigma_{t''}}{\sigma_t}} \alpha_t}\right\|_2^2,$$

wherein $$w(\lambda_t) = \max\left(\frac{\alpha_t^2}{\sigma_t^2}, 1\right)$$

is a truncated SNR weighting coefficient, wherein $w(\lambda_t)$ is a truncated signal-to-noise ratio (SNR) weighting coefficient determined as a function of a relative signal-to-noise parameter $\lambda_t$ for a diffusion timestep $$t, x_t^{(s)}$$

represents a predicted denoised latent produced by the student latent diffusion machine learning model at the timestep t. $Z_{t''}$ represents a teacher-model-generated noisy latent at an earlier timestep t", $\alpha_t$ and $\sigma_t$ are timestep-dependent signal and noise scaling coefficients, respectively, determined by a diffusion noise schedule, $\alpha_t$ and $\sigma_t$ are corresponding signal and noise scaling coefficients associated with the timestep t", and $$\|\cdot\|_2^2$$

denotes a squared Euclidean norm computed in latent space.

* * * * *